(12) United States Patent
De Sorbier

(10) Patent No.: US 10,864,462 B2
(45) Date of Patent: Dec. 15, 2020

(54) UNDERWATER FACILITY FOR GAS/LIQUID SEPARATION

(71) Applicant: TECHNIP FRANCE, Courbevoie (FR)

(72) Inventor: Thibault De Sorbier, La Celle-Saint-Cloud (FR)

(73) Assignee: TECHNIP FRANCE

( * ) Notice: Subject to any disclaimer, the term of this patent is extended or adjusted under 35 U.S.C. 154(b) by 340 days.

(21) Appl. No.: 15/751,941

(22) PCT Filed: Aug. 9, 2016

(86) PCT No.: PCT/FR2016/052059
§ 371 (c)(1),
(2) Date: May 23, 2018

(87) PCT Pub. No.: WO2017/025690
PCT Pub. Date: Feb. 16, 2017

(65) Prior Publication Data
US 2019/0022560 A1    Jan. 24, 2019

(30) Foreign Application Priority Data

Aug. 10, 2015    (FR) ...................................... 15 57639

(51) Int. Cl.
*B01D 19/00* (2006.01)
*E21B 43/36* (2006.01)
(Continued)

(52) U.S. Cl.
CPC ..... *B01D 19/0042* (2013.01); *B01D 19/0068* (2013.01); *E21B 17/012* (2013.01); *E21B 43/36* (2013.01)

(58) Field of Classification Search
CPC ................ B01D 19/00; B01D 19/0042; B01D 19/0068; B01D 19/0063; B01D 19/0036; E21B 43/36; E21B 17/012
See application file for complete search history.

(56) References Cited

FOREIGN PATENT DOCUMENTS

| GB | 104 183 A | 2/1918 | |
| GB | 104183 | * 2/1918 | ............. B01D 19/00 |

(Continued)

OTHER PUBLICATIONS

International Search Report dated Nov. 21, 2016 in corresponding PCT International Application No. PCT/FR2016/052059.
(Continued)

*Primary Examiner* — Youngsul Jeong
(74) *Attorney, Agent, or Firm* — Ostrolenk Faber LLP

(57) ABSTRACT

An underwater facility (18) for the gas/liquid separation of a multiphase hydrocarbon mixture includes an underwater supply conduit (16) and a longitudinal separation chamber (26) intended to be installed substantially vertically, the separation chamber (26) having a lower end (30) and an opposing upper end (28), and an intermediate separation area (32), the separation chamber (26) further comprising an injection conduit (34) connected to the supply conduit (16), the injection conduit extending longitudinally into the intermediate area (32), the injection conduit having a tubular wall and a free opening that opens towards the upper end (28). The tubular wall is continuous to be impervious to the multiphase hydrocarbon mixture.

21 Claims, 13 Drawing Sheets

(51) Int. Cl.
    *E21B 17/00*   (2006.01)
    *E21B 17/01*   (2006.01)

(56) References Cited

FOREIGN PATENT DOCUMENTS

| | | | | |
|---|---|---|---|---|
| GB | 2 260 087 A | | 4/1993 | |
| GB | 2260087 A | * | 4/1993 | ......... B01D 19/0042 |
| WO | WO 2011/073203 A1 | | 6/2011 | |
| WO | WO-2011073203 A1 | * | 6/2011 | ......... B01D 19/0031 |
| WO | WO 2014/029854 A1 | | 2/2014 | |
| WO | WO-2014029854 A1 | * | 2/2014 | ......... B01D 19/0073 |

OTHER PUBLICATIONS

Written Opinion dated Nov. 21, 2016 in corresponding PCT International Application No. PCT/FR2016/052059.

* cited by examiner

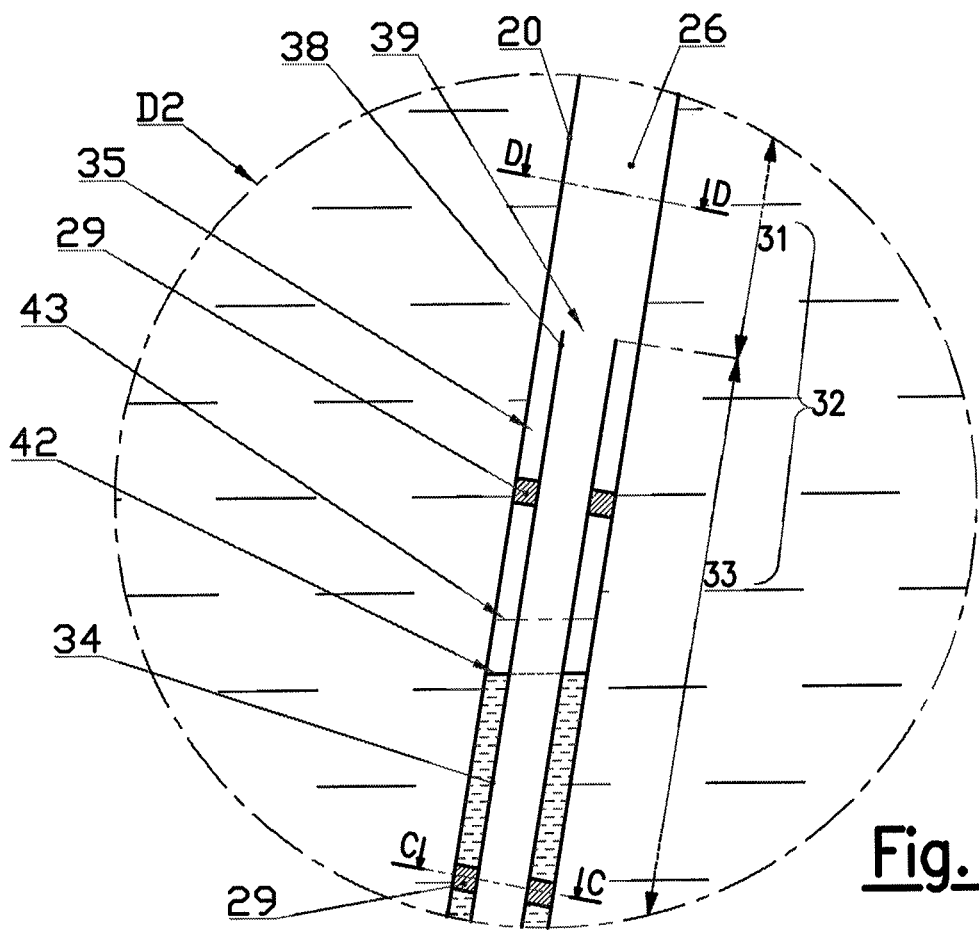
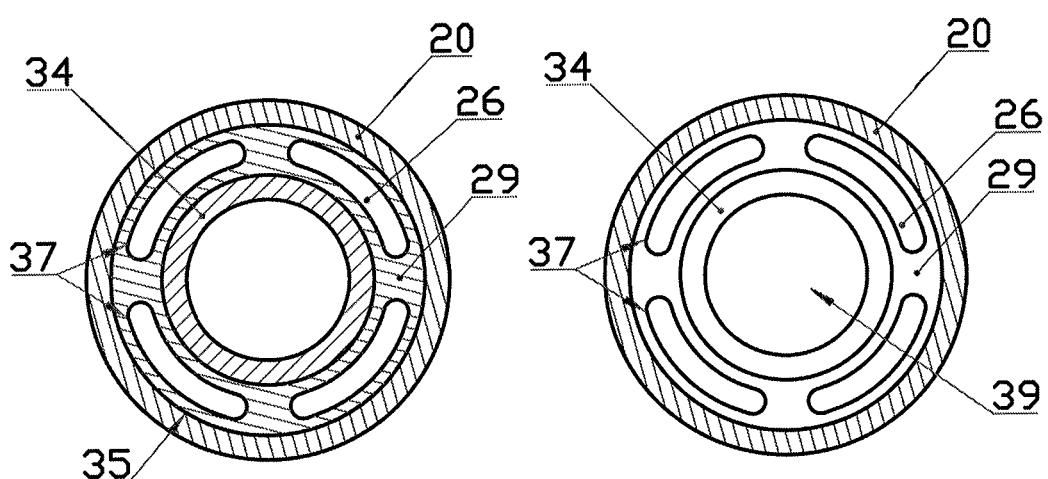

UNDERWATER FACILITY FOR GAS/LIQUID SEPARATION

CROSS-REFERENCE TO RELATED APPLICATIONS

The present application is a 35 U.S.C. §§ 371 national phase conversion of PCT/FR2016/052059, filed Aug. 9, 2016, which claims priority to French Patent Application No. 1557639, filed Aug. 10, 2015, the contents of which are incorporated herein by reference. The PCT International Application was published in the French language.

TECHNICAL FIELD

The present invention relates to an underwater facility for gas/liquid separation of a multiphase hydrocarbon mixture that may contain water.

One field of application envisaged is that of extraction of hydrocarbons located in the sea bed.

TECHNICAL BACKGROUND

Deposits of hydrocarbons contain both hydrocarbons and water. When these fluids are extracted from the sea bed they are subjected to the action of a pressure drop that gives rise to liquid and gaseous hydrocarbon streams, which generally contain an aqueous liquid phase. The greater the depth of the sea bed, the higher is the hydrostatic back pressure from the weight of the column of fluid to be raised to the surface facility and therefore it is more difficult to bring the production fluids into production and there is limited potential for recovery of the hydrocarbons from the deposit. Several techniques such as gas injection or underwater multiphase pumping can facilitate this bringing into production. Another solution is underwater gas/liquid separation of the multiphase hydrocarbon mixture.

Gravity separation of the gas phase comprising the gaseous hydrocarbons from the liquid phase comprising the liquid hydrocarbons and water, in the underwater environment before being raised to the surface via a lifting pump, has been developed. Thus, the facility comprises on the one hand an underwater supply line of the multiphase hydrocarbon mixture, which may contain water, derived from the hydrocarbon deposit, and on the other hand a longitudinal separating chamber installed approximately vertically in the sea bed. The separating chamber has a lower end and an opposite upper end, as well as an intermediate separating zone located between the two opposite ends. Moreover, the separating chamber comprises a line for injection of the multiphase hydrocarbon mixture, which may contain water, connected to the supply line, and extending longitudinally inside the intermediate zone to the upper end. The injection line has a free end and radial slots extending upstream of the free end. Reference may notably be made to document GB 2 260 087, which describes a line of this kind.

This type of facility has several drawbacks.

Firstly, there is a risk of very considerable foaming due to the shearing of the fluid through the radial slots. This shearing causes bursting of the gas bubbles initially contained in the liquid phases into finer gas bubbles, as well as dispersion of said finer gas bubbles in the liquid phases. Now, the finer the gas bubbles, the more difficult it is for said gas bubbles to coalesce, and the less said gas bubbles will tend to rise to the surface and escape from the liquid phases. There is then a greatly increased risk of entrainment of the gas bubbles with the liquid phases, and conversely, a greatly increased risk of entrainment of fine droplets of liquid phases with the escaping gas phase. The efficiency of gas/liquid separation is thus greatly reduced. Furthermore, measurement and monitoring of the true level of the gas/liquid interface are disturbed by the column of foam.

Moreover, there is a risk of inequality of residence time between the fluid flowing through the upper radial slots and that flowing through the lower radial slots. In fact, the multiphase hydrocarbon mixture flowing through the lower radial slots tends to be aspirated, directly downwards, by the lifting pump with priority over the multiphase hydrocarbon mixture flowing through the upper radial slots. Thus, there is a risk of the multiphase hydrocarbon mixture flowing through the lower radial slots only staying for a very short time in the upper part of the column of multiphase hydrocarbon mixture formed around the injection line, where gas/liquid separation mainly takes place. Now, gas/liquid separation is better the greater the residence time in said upper part of the column of multiphase hydrocarbon mixture formed around the injection line. In fact, the deeper the multiphase hydrocarbon mixture in the column of multiphase hydrocarbon mixture formed around the injection line, the more the pressure exerted by the upper part of said column of multiphase hydrocarbon mixture tends to maintain a part of the gas phase in the liquid state and compress the gas bubbles into fine bubbles, which are more easily entrained with the liquid phases. Therefore the higher the viscosity of the multiphase hydrocarbon mixture, the more the upper part of the column of multiphase hydrocarbon mixture opposes gas/liquid separation.

Furthermore, the multiphase hydrocarbon mixture may also contain impurities and notably a certain amount of sand and/or sediments. When these impurities enter the vertical chamber, they are drawn off with the multiphase hydrocarbon mixture in order to prevent any accumulation and therefore blockage.

Accordingly, there is a phenomenon of abrasion, and erosion of the metal surfaces flanking the radial slots, and this phenomenon increases with the flow rate.

In the long term, this phenomenon may lead to breaking and detachment of metal parts, which will be entrained with the multiphase hydrocarbon mixture. Besides the clogging of the pipes that the detached metal parts may cause, there is a risk of damage, or even destruction, of the lifting pump.

Finally, there is a considerable risk of clogging of the aforementioned radial slots, notably with impurities, but also with paraffins, or hydrates, particularly during the phases of production shutdown.

Accordingly, the gas phase of the multiphase hydrocarbon mixture escapes to the upper end of the separating chamber, whereas the liquid phase goes to said lower end. Thus, the liquid phase is generally two-phase, since it is an immiscible mixture of hydrocarbons and water, and also includes sand and sediments in suspension. The lower end of the separating chamber is preferably connected to a pipe for recovery of the two liquid phases by means of a lifting pump; said recovery pipe then extending to the surface. In its turn, the upper end of the separating chamber is connected to an exhaust pipe that also extends to the surface so as to be able to recover the gas phase from the mixture.

The lifting pump is dependent on the liquid flow rate of the multiphase mixture of liquid hydrocarbons and water in the underwater supply line so as to make it possible to optimize the separation of the gaseous and liquid phases in the separating chamber. Notably, the actual level of the interface between the gas phase and liquid phases, called gas/liquid interface hereinafter, will be adjusted relative to the injection line of the mixture inside the separating chamber by controlling the operational delivery of the lifting pump. However, this gas/liquid interface is difficult to stabilize and in practice it is observed to fluctuate in the separating chamber.

SUMMARY OF THE INVENTION

Thus, a problem that arises, and that the present invention aims to solve, is to be able to improve the efficiency of separation of the gas phase and liquid phases, called gas/liquid separation hereinafter, inside the separating chamber.

For this purpose, the present invention proposes an underwater facility for gas/liquid separation of a multiphase hydrocarbon mixture. The multiphase hydrocarbon mixture comprises a gas phase and at least one liquid phase. The facility comprises, on the one hand, an underwater supply line of said multiphase hydrocarbon mixture, and on the other hand a longitudinal separating chamber intended to be installed approximately vertically. The separating chamber has, on the one hand, a lower end and an opposite upper end, and on the other hand an intermediate separating zone located between the two opposite ends. The separating chamber further comprises an injection line connected to said supply line and extending longitudinally inside said intermediate zone. The injection line has a tubular wall and a free end having an axial opening going into said separating chamber, in such a way as to allow said at least one gas phase to escape to said upper end of said separating chamber, whereas said at least one liquid phase goes to said lower end. Said tubular wall is continuous so as to be impervious to said multiphase hydrocarbon mixture.

Thus, one feature of the invention involves the employment of an injection line whose tubular wall lacks an opening, so that the multiphase hydrocarbon mixture is injected into the separating chamber through its single axial opening. Consequently, a definite gas/liquid interface between gas phase and liquid phases, which is more easily controllable, is obtained inside the separating chamber. More precisely, control of the relative position of said gas/liquid interface in relation to the axial opening of the injection line, which is located at its free end, and from which the multiphase hydrocarbon mixture is injected into the separating chamber, is important for optimizing gas/liquid separation.

Thus, in normal operation, the multiphase hydrocarbon mixture is injected above the gas/liquid interface, or into the gas phase, so as to minimize the gas content of the separated liquids.

In other words, the gas/liquid interface must be positioned, as far as possible, below the free end of the injection line in a zone called the secondary separating zone. The latter extends from the free end of the injection line to the lower end of the separating chamber. However, it is conceivable, but not obligatory, that the flow conditions in the injection line, and possibly upstream in the underwater supply line, are disturbed and of the "slug" type. In these disturbed slugging flow conditions, the injection line is alternately filled with pockets of gas phases and plugs of liquid phases moving in time and space. On arrival of pockets of gas phase and plugs of liquid phases in the separating chamber, the plugs of liquid phases accumulate in the separating chamber, and notably in the secondary separating zone and tend to increase the level of the separating gas/liquid interface. The secondary separating zone then acts as a buffer zone. Exceptionally, the level of the gas/liquid interface might increase until it is temporarily above the free end of the injection line. In these disturbed flow conditions there is appreciable degradation of the quality of gas/liquid separation.

Thus, in nominal operation, i.e. for continuous flow conditions, in other words without slugging flow, the level of the gas/liquid interface is far enough below the free end of the injection line, and the buffer volume of the annular space contained between the nominal gas/liquid interface and the free end of the injection line may be sufficient to absorb, by acting as a buffer zone, most of the accumulations caused by the plugs of liquid phases while maintaining the efficiency of gas/liquid separation. This buffer volume is dimensioned as a function of the field data (pressure, temperature, viscosity, etc.) and of the dimensions of the supply line, or "flowlines". In practice, for a supply line with an inside diameter between 5 inches, or about 0.130 m, and 16 inches, or about 0.406 m, a buffer volume of 9 $m^3$ seems sufficient in most cases. This buffer volume may, however, vary from 5 to 25 $m^3$ or even more.

Furthermore, in cases when the liquid phases would accumulate in the separating chamber until they cover the free end of the injection line, the absence of a radial slot on said injection line concentrating all of the flow of the multiphase hydrocarbon mixture on the axial opening of the free end of said injection line, on the one hand, and optionally a reduction of the inside diameter of said injection line toward the free end, also called throttling, allowing said multiphase hydrocarbon mixture to be accelerated, on the other hand, help to inject said multiphase hydrocarbon mixture at high velocity into the separating chamber, so as to create a jet of multiphase hydrocarbon mixture at the level of the axial opening of the free end of said injection line, said jet passing through the liquid phases accumulated in said separating chamber, above said free end of said injection line.

Moreover, by accelerating the multiphase hydrocarbon mixture, notably with throttling as described above, the flow conditions of the multiphase hydrocarbon mixture inside the injection line tend to become annular. In annular flow of this kind, the liquid phase or phases are flattened against the inside wall of the injection line, whereas the less dense gas phase will be expelled from the liquid phase or phases and will end up in a central zone of said injection line, thus promoting gas/liquid separation inside said injection line. When the multiphase hydrocarbon mixture is propelled through the axial opening of the free end of the injection line, the liquid phase or phases initially flattened against the inside wall of said injection line will be propelled radially against the inside walls of the separating chamber, generating a central space via which the gas phase will be able to escape freely in the direction toward the upper end of the injection pipe, thus promoting gas/liquid separation inside said separating chamber.

Thus, degradation of performance is minimized and the dimensions of the separating chamber can be kept compact.

The fact that the injection line is not perforated also means there is a decrease in shearing during gas/liquid separation, and therefore the risk of foaming is minimized. In fact, foaming has a negative impact on gas/liquid separation, and also makes it more difficult to control and monitor the position of the gas/liquid interface.

Furthermore, the absence of radial openings in the tubular wall of the injection line limits stirring of the multiphase mixture of hydrocarbons separated first, and can improve the quality of the gas phase recovered.

According to another advantageous feature of the invention, the underwater facility comprises an exhaust pipe for said at least one gas phase extending in the prolongation of said upper end. In practice, the exhaust pipe may be installed according to several configurations: A rigid configuration of catenary riser, called SCR, the acronym of "Steel Catenary Riser"; a hybrid catenary riser configuration, called HCR, for "Hybrid Catenary Riser"; a hybrid configuration of free standing riser called FSHR, for "Free Standing Hybrid Riser"; a flexible configuration of free standing riser called FSFR, for "Free Standing Flexible Riser", a configuration combining two or more of the aforementioned configurations, or any other configuration considered suitable by a person skilled in the art.

Preferably, the exhaust pipe extends vertically in the prolongation of the separating chamber directly up to the surface so as to be able to recover the gas phase at the level of a surface facility. In that way, the condensates and the fine droplets of entrained liquid phases that may be deposited on the inside walls of the separating chamber or of the exhaust pipe drop down by gravity and are removed with the liquid phases. The quality of the gas phase produced is therefore improved. On the contrary, in a free standing hybrid riser configuration called FSHR, a flexible pipe connects the upper end of the exhaust pipe to the surface facility, or "topside". Under the effect of its own weight, this flexible pipe generally assumes an inverted bell shape, which generates a low point in front of the surface, at the level of which there is a risk of accumulation of the water that would have condensed and that would pose a risk of initiating the formation of solid hydrate.

According to yet another advantageous feature of the invention, the underwater facility comprises a pipe for recovery of said at least one liquid phase extending in the prolongation of the lower end of the separating chamber. Just like the exhaust pipe, the recovery pipe extends to the surface as far as the surface facility to make it possible to recover the mixture of liquid phases.

Thus, at least two possibilities are offered for implementing the underwater facility. It is possible to install, on the one hand all in one piece, the assembly formed by the underwater supply line, the separating chamber and the exhaust pipe, and on the other hand the recovery pipe, so as to be able to connect it to said assembly. According to another variant it is also possible to install, on the one hand, the assembly formed by the underwater supply line and the recovery pipe, and on the other hand the assembly formed by the separating chamber and the exhaust pipe, so that it is then possible to connect the two assemblies. Such possibilities make it possible to reduce the installation costs and time substantially.

According to a particularly advantageous embodiment of the invention, in which a supporting structure is not used at the level of the ground and accordingly there is no work of preparation of the ground for receiving said supporting structure or campaign for installation of said supporting structure, the separating chamber is suspended in a marine environment. It is preferably suspended with the rest of the exhaust pipe and optionally the recovery pipe to which said separating chamber is connected. In practice, the separating chamber is suspended by suspending the exhaust pipe on the surface facility or by means of one or more buoys.

Particularly advantageously, the underwater facility further comprises at least one lifting pump of said at least one liquid phase, said at least one lifting pump being connected to the lower end of the separating chamber. In that way, said at least one liquid phase of the separated multiphase hydrocarbon mixture is aspirated by said at least one lifting pump so as to be able to drive said at least one liquid phase up to the surface facility. Said at least one liquid phase is driven via the recovery pipe, without said at least one liquid phase accumulating at the level of the axial opening of the free end of the injection line. Otherwise, on accumulating at the level of the axial opening, said at least one liquid phase would risk reducing the flow rate of the multiphase hydrocarbon mixture propelled through said axial opening and therefore by the same token would risk reducing the flow rate of the multiphase hydrocarbon mixture flowing in the underwater supply line. Moreover, the lifting pump or pumps allow better control of the vertical position of the gas/liquid interface in the separating chamber. In a preferred embodiment of the invention, the lifting pump is a vertical pump provided in the prolongation of the lower part of the recovery pipe.

Preferably, the injection line and the intermediate zone are approximately coaxial. In that way, owing to regular, symmetric geometry, the rates of mass transfer inside the separating chamber are relatively uniform, which allows better distribution of the liquid phase or phases and better stabilization of the gas/liquid interface. Furthermore, the cross-sectional area of said lower end of said separating chamber is less than the difference of the cross-sectional areas of said intermediate zone and said injection line. Thus, the multiphase mixture that has undergone a first gas/liquid separation at the outlet of the injection line flows less quickly in the annular space, than in the lower end of the separating chamber, and then in the recovery pipe, thus increasing the residence time of the fluid in said annular space and promoting a second gas/liquid separation at the level of this annular space. Annular space means the space extending between the outside wall of the injection line and the inside wall of the separating chamber.

According to a particularly advantageous embodiment of the invention, the ratio of the diameters of said cross sections of said intermediate zone and of said injection line is between 1.5 and 20. Advantageously, this ratio is 10. Thus, the separating chamber may be provided in the exhaust pipe which is like a conventional underwater riser, having a diameter of 500 mm, or about 20 inches, for example, whereas the injection line located inside may have a diameter of 200 mm, or about 8 inches. In this way it is easy to unwind the exhaust pipe, defining the separating chamber, from a conventional pipe-laying vessel, and notably through the moonpool present on certain conventional pipe-laying vessels. Furthermore, more generally, the compact dimensions of the separating chamber, and of the exhaust pipe overall, make it possible to pass said exhaust pipe through the tensioners and clamps of a conventional pipe-laying vessel used traditionally for installation of rigid or flexible pipes is of the underwater supply line type ("flowline") or underwater riser. This lowers the costs of implementing the underwater facility according to the invention.

It will be observed that the exhaust pipe may be a flexible pipe, or else a rigid steel pipe installed as a catenary, or else an assembly of rigid and flexible pipes in a hybrid configuration, HCR or FSHR.

According to another advantageous embodiment of the invention, said separating chamber comprises devices for diverting said multiphase hydrocarbon mixture to promote gas/liquid separation. The diverting devices are preferably arranged on the flow path of the mixture of the gaseous and liquid phases so as to promote gas/liquid separation. According to one embodiment, said diverting devices are mounted rotatably. Thus, the diverting devices are for example formed from propellers that can provide local acceleration of the flow of the mixture of the gaseous and liquid phases and promote gas/liquid separation by a centrifugal effect. According to another embodiment of the invention, the diverting devices are mounted in a fixed position inside the separating chamber. The diverting devices are configured to withstand the erosion generated by the solid particles, such as sand and impurities, contained in the multiphase hydrocarbon mixture, while maintaining their efficiency throughout the period of use.

Furthermore, according to a particularly advantageous embodiment, said diverting devices comprise a helical plate installed around said injection line. The advantages of such a plate will be explained in detail later in the description.

Moreover, according to yet another preferred embodiment of the invention, said separating chamber has a chamber length and a chamber diameter, and said chamber length is fifty times larger than said chamber diameter. The ratio of chamber length to chamber diameter is mainly determined by the required residence time, or dwell time, of the multiphase hydrocarbon mixture inside the separating chamber. This residence time is a function of the flow rate of the multiphase hydrocarbon mixture entering the separating chamber and of the volume of the latter.

According to yet another preferred embodiment of the invention, the exhaust pipe and the recovery pipe meet inside a double-walled pipe, with the recovery pipe extending annularly around the exhaust pipe, or vice versa.

According to yet another preferred embodiment of the invention, the exhaust pipe and the recovery pipe meet in a first umbilical with several fluid lines, said exhaust pipe being connected to a first set of one or more fluid lines of said first umbilical and said recovery pipe being connected to a second set of one or more fluid lines of said first umbilical different from the fluid lines of said first set.

Other particular features and advantages of the invention will become clearer on reading the following description of particular embodiments of the invention, given as a guide but nonlimiting, referring to the appended drawings.

BRIEF DESCRIPTION OF THE DRAWINGS

FIG. 7 is a schematic axial sectional view of another detail D2 indicated in FIG. 1 illustrating an element of the underwater facility according to the first embodiment;

FIG. 8 is a schematic cross-sectional view in plane C-C of a detail illustrated in FIG. 7;

FIG. 9 is a schematic cross-sectional view in plane D-D of another detail illustrated in FIG. 7;

Identical references will be used from one figure to another to designate identical or similar elements.

DESCRIPTION OF EMBODIMENTS

Figure 1:
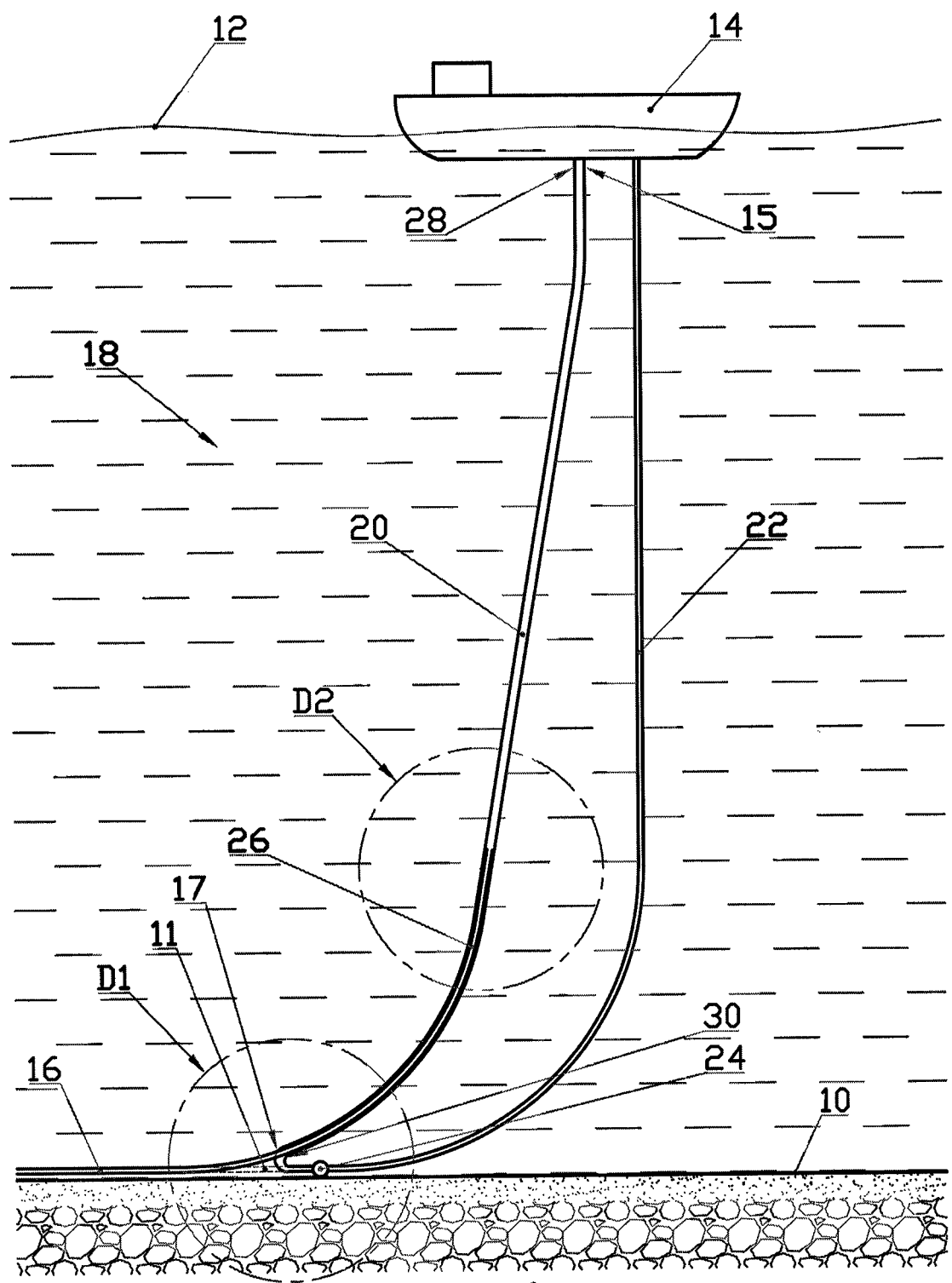
FIG. 1 is a schematic view illustrating the underwater facility of the invention according to a first embodiment.

FIGS. 1 to 3 and 19 illustrate a marine environment extending vertically from a sea bed 10 to a sea surface 12. A surface facility 14 is floating on the sea surface 12, while an underwater supply line 16 connected upstream to a hydrocarbon deposit, not shown, located in the subsoil of the sea bed 10, will extend roughly vertically to the sea bed 10. The hydrocarbon deposit may be an oil deposit or a natural gas deposit, or a mixture of the two. The surface facility 14 may notably be of the FPSO type, for "Floating Production Storage and Offloading", FLNG for "Floating Liquefied Natural Gas", SPAR for "Single Point Anchor Reservoir", semi-submersible, etc. Obviously, in certain circumstances, the wells drilled in the hydrocarbon deposits may be far from vertically down from the surface facility 14, and therefore the underwater supply line 16 as well, or at the very least the underwater supply line 16 may have an end closer to vertically down from the surface facility 14, from which said underwater supply line extends so that it departs from the vertical until it reaches the hydrocarbon deposit.

The hydrocarbon deposit contains a multiphase hydrocarbon mixture comprising a gas phase and at least one carbon-containing liquid phase.

Generally, the multiphase hydrocarbon mixture further comprises an aqueous liquid phase. It will be observed that the surface facility 14 may also be a fixed platform attached to the sea bed, or else an onshore platform, the wells being located offshore near the coast.

Thus, a mixture of gas phase and liquid phases, called multiphase hydrocarbon mixture hereinafter, circulates in the underwater supply line 16.

Furthermore, FIGS. 1 to 3 and 19 illustrate an underwater facility 18 for gas/liquid separation, precisely intended for separating the gas phase from the liquid phase or phases. The underwater facility 18 has an exhaust pipe 20, to which the underwater supply line 16 and a recovery pipe 22 are connected. The recovery pipe 22 has a U-connection in the sea bed 10 to the exhaust pipe 20 via one or more lifting pumps 24. In embodiments that are not shown, the underwater facility 18 for gas/liquid separation may comprise several recovery pipes 22.

Figure 2:
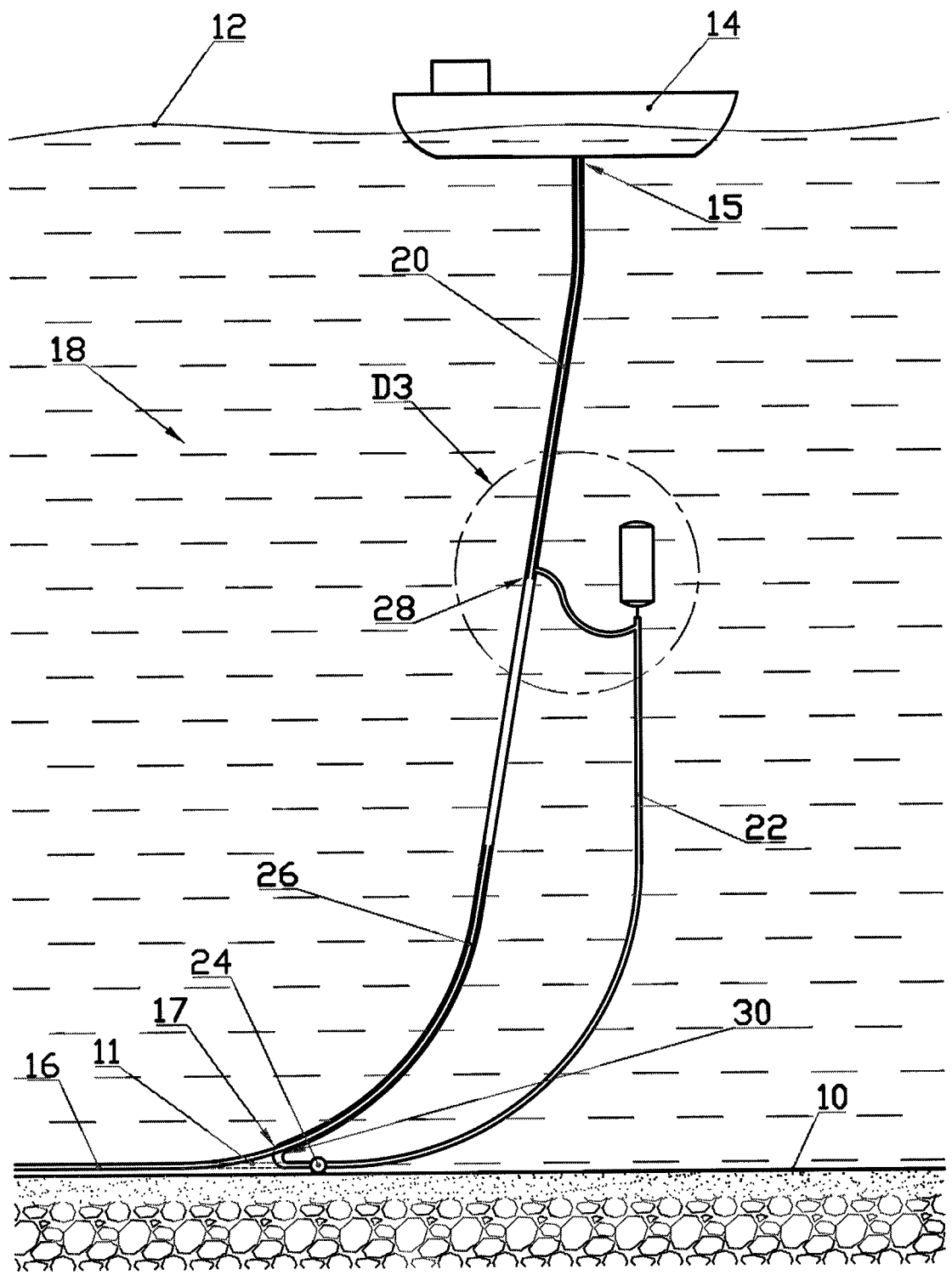
FIG. 2 is a schematic view illustrating the underwater facility of the invention according to a second embodiment.
Figure 3:
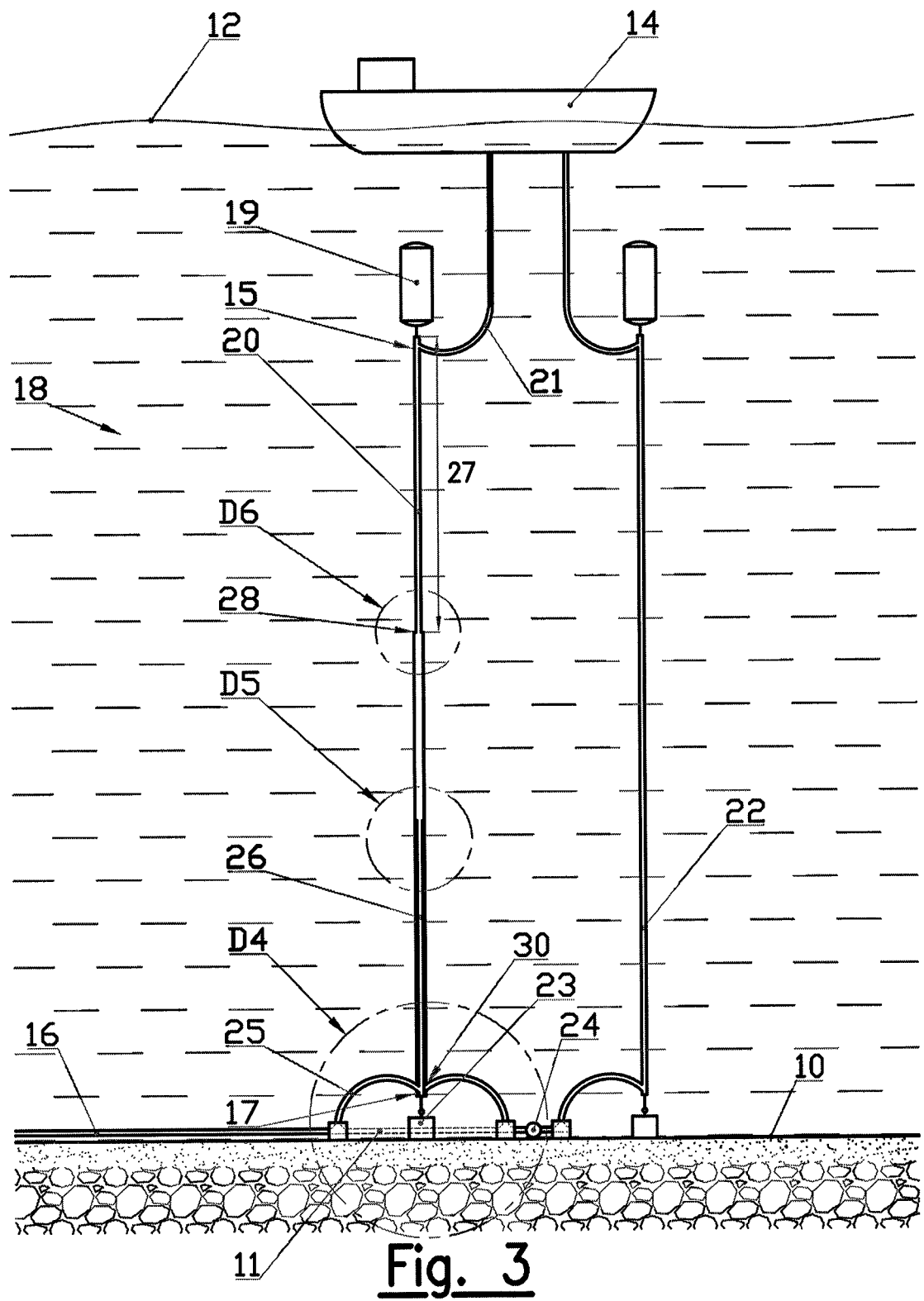
FIG. 3 is a schematic view illustrating the underwater facility of the invention according to a third embodiment.
Figure 10:
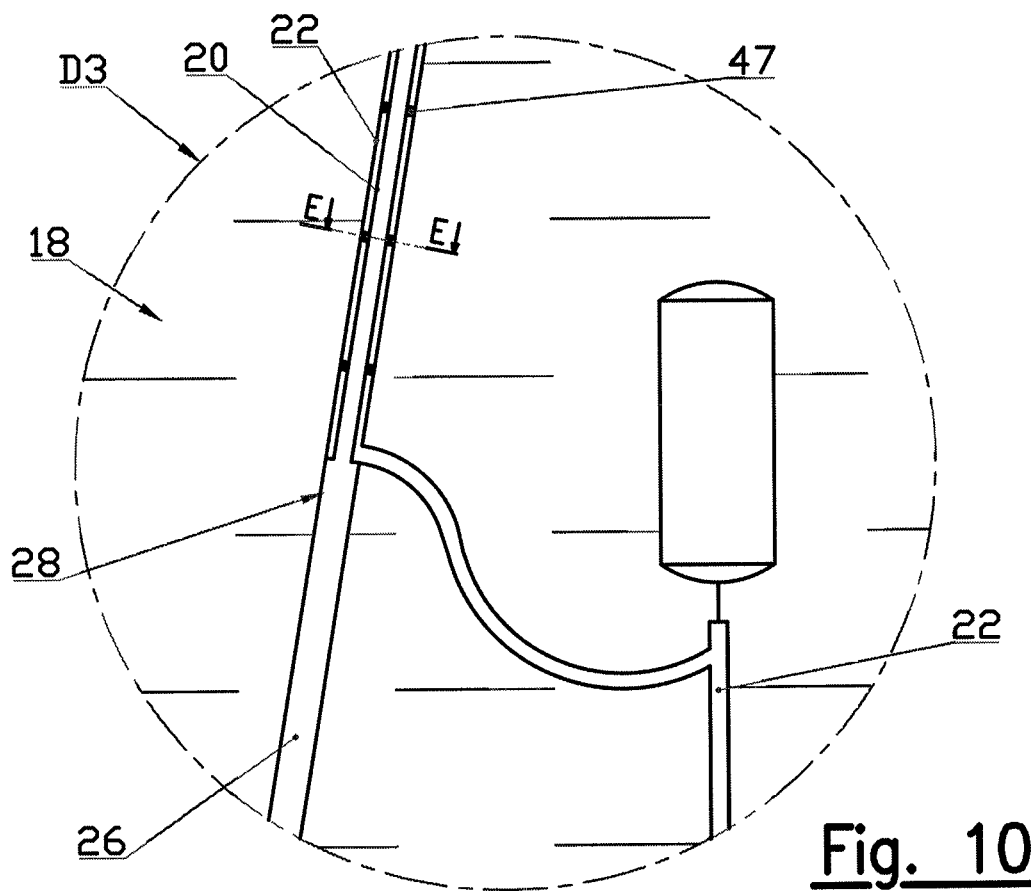
FIG. 10 is a schematic view of a detail D3 indicated in FIG. 2 illustrating an element of the underwater facility according to the second embodiment.
Figure 19:
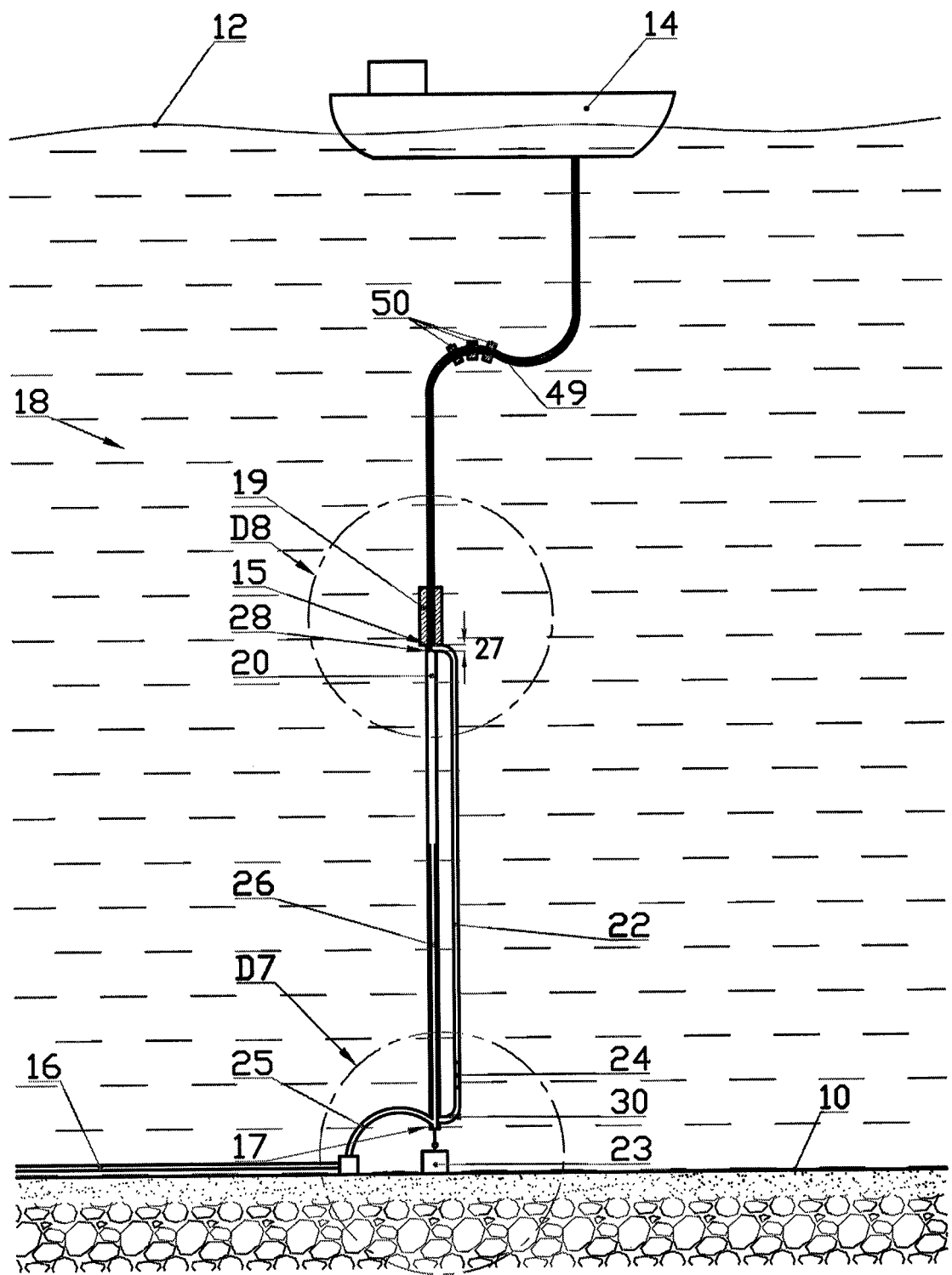
FIG. 19 is a schematic view illustrating the underwater facility of the invention according to a third embodiment; and, FIG. 20 is a schematic view of yet another detail D7 indicated in FIG. 19; and, FIG. 21 is a schematic view of yet another detail D8 indicated in FIG. 19.
Figure 21:
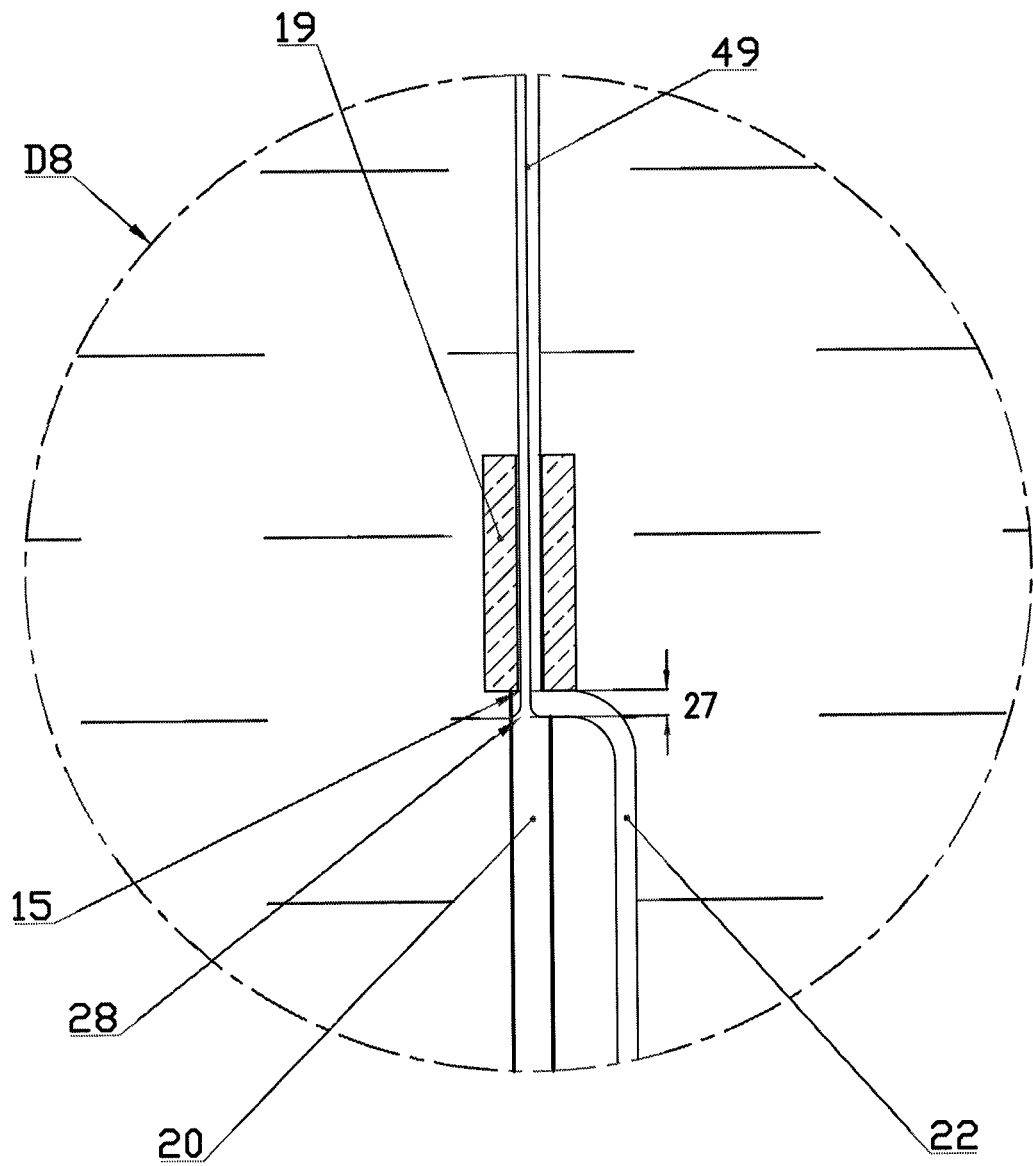

According to the embodiments illustrated in FIGS. 1 and 3, the exhaust pipe 20 and the recovery pipe 22 reach the surface facility 14 roughly parallel, whereas the embodiments illustrated in FIGS. 2 and 19 show the exhaust pipe 20 and the recovery pipe 22 meeting inside a double-walled pipe, which is connected to the surface facility 14. FIG. 10 shows in more detail the exhaust pipe 20 and the recovery pipe 22 that will extend annularly around the exhaust pipe 20, but in other embodiments the exhaust pipe 20 could extend annularly around the recovery pipe 22. They thus constitute a double-walled pipe, or "pipe in pipe", connected directly to the surface facility. According to yet another embodiment shown in FIGS. 19 and 21, the exhaust pipe 20 and the recovery pipe 22 that are joined in a first umbilical 49 with several fluid lines, which is connected to the surface facility 14, said exhaust pipe being connected to a first set of one or more fluid lines of said first umbilical and said recovery pipe being connected to a second set of one or more fluid lines of said first umbilical different from the fluid lines of said first set. The first umbilical 49 may, in particular, be of the type of umbilical with integrated production lines, called IPB, for "Integrated Production Bundle". In particular, the use of an umbilical makes it possible to incorporate other functions in the exhaust and recovery lines, for example a function of heating by means of electric heating cables, a function of injection of chemicals via dedicated fluid lines, a function of control of underwater equipment via lines for electrical, optical, or fluidic control, or others. At the level where the exhaust pipe 20 and the recovery pipe 22 meet in a double-walled pipe or the first umbilical 49 with several fluid lines, the underwater facility may comprise a junction element. This junction element is generally metallic and is fixed to the exhaust pipe 20 and recovery pipe 22 by flange, welding or any other means considered suitable by a person skilled in the art. According to yet another embodiment, the exhaust pipe 20 and the recovery pipe 22 meet in a riser tower, said riser tower comprising a group of pipes of the type of rigid, flexible, or umbilical pipes, double-walled pipes, or a combination of these pipes.

Figure 11:
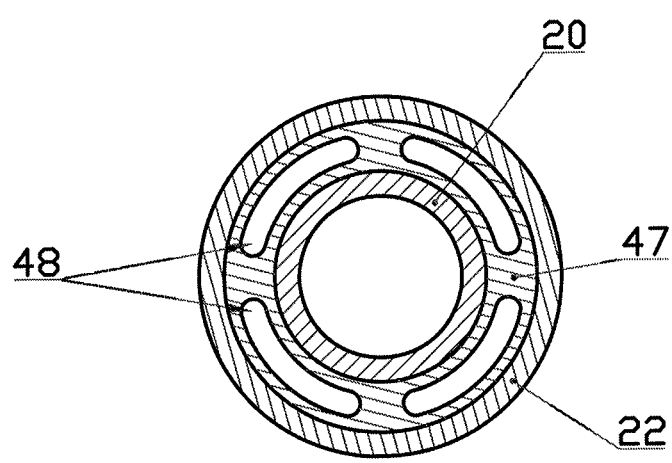
FIG. 11 is a schematic cross-sectional view in plane E-E of a detail illustrated in FIG. 10.
Figure 12:
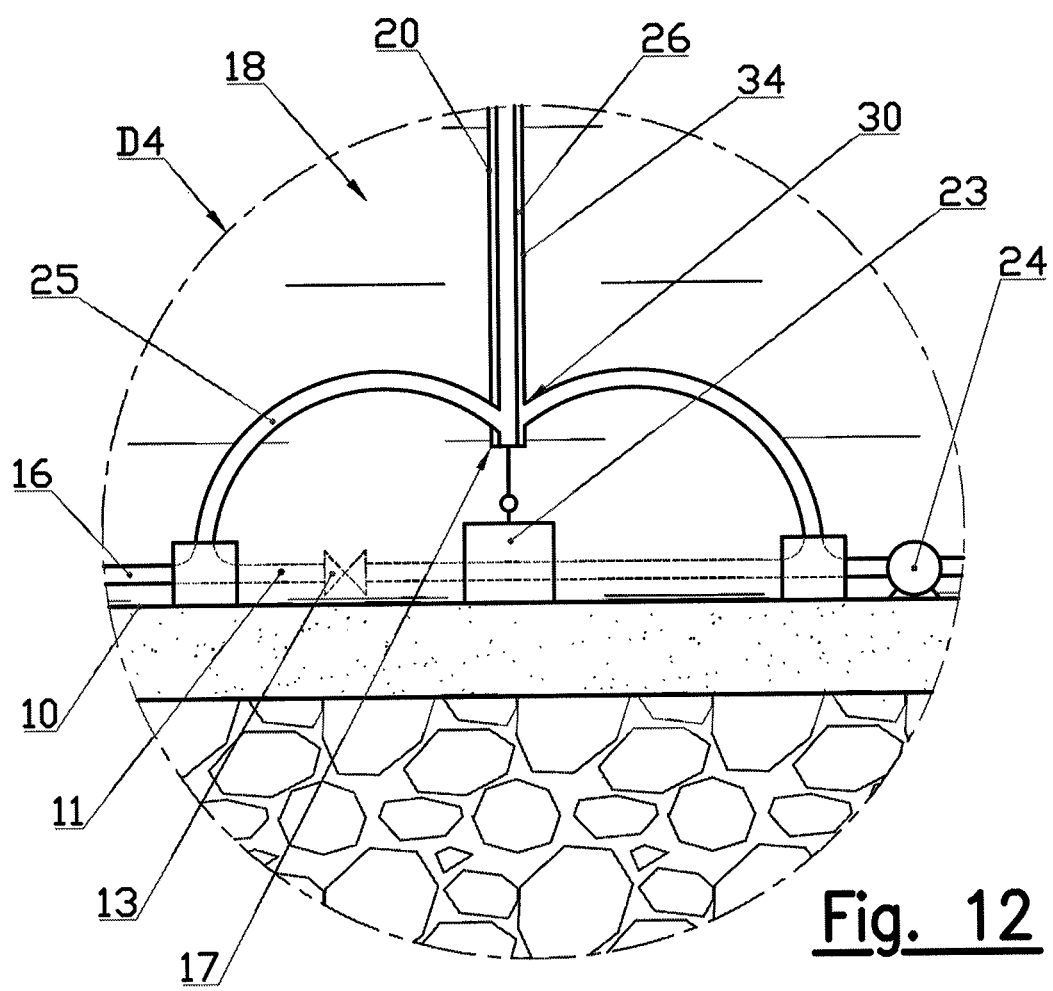
FIG. 12 is a schematic view of a detail D4 indicated in FIG. 3 illustrating an element of the underwater facility according to the third embodiment.

When the exhaust pipe 20 and the recovery pipe 22 meet inside a double-walled pipe, as shown in FIG. 11, one or more upper centering blocks 47, or spacers, may be fitted in the annular space of the double-walled pipe so as to hold the exhaust pipe 20 in position at the center of the recovery pipe 22. The upper centering block or blocks 47 comprise one or more holes 48 allowing the liquid phase or phases to circulate along the annular space.

This embodiment makes it possible to simplify installation. It is also envisaged, in another embodiment, that the gas phase takes the annular path, while the liquid phase flows in the central part.

As shown in FIGS. 1 to 4 and 12, the underwater facility 18 is equipped with a bypass line 11 equipped with a stop valve 13 and connecting the underwater supply line 16 and the recovery pipe 22. In the normal operating phase, the stop valve 13 is in the closed position and opposes passage of the mixture of gas phase and liquid phases through bypass line 11. However, during operations of maintenance and scraping of the recovery pipe 22 in particular, or when the multiphase hydrocarbon mixture no longer contains enough gas, the stop valve 13 is moved to the open position so as to allow passage of the devices for maintenance and/or scraping, and/or passage of the multiphase hydrocarbon mixture through the bypass line 11 so as to divert said multiphase hydrocarbon mixture directly into the recovery pipe 22, without prior gas/liquid separation. Moreover, another valve, not shown, may be installed at the junction between the underwater supply line 16 and the injection line 34 in order to prevent the return of liquid, or of the scraping device, or "PIG" (for "Pipeline Intervention Gadget"), inside when the stop valve is in the open position.

According to a particular embodiment of the invention, notably with considerable depths of water and therefore a cold environment of the underwater facility 18, the exhaust pipe 20 and the recovery pipe 22 have an external insulation covering to prevent heat transfer from the interior to the exterior of said exhaust pipe 20 and recovery pipe 22 and therefore limit the temperature decrease of the gas phase and liquid phases circulating in said exhaust and recovery pipes. If necessary, heating cables may be wound round the exhaust pipe 20 and recovery pipe 22 so as to heat said exhaust pipe 20 and recovery pipe 22 and therefore prevent cooling of the gas phase and liquid phases circulating in said exhaust and recovery pipes. The aim here is to prevent the formation of hydrate, paraffin, and ice, as well as prevent an increase in the viscosity of the liquid phases. Moreover, electric and/or optical cables may be installed along the pipes so as to be able to monitor the temperature inside the exhaust pipe 20 and recovery pipe 22, and/or monitor other parameters, and/or control the heating cables or other active devices of the underwater facility 18. Parameters may be monitored by means of instruments or sensors connected and installed in, on and around the underwater facility 18.

FIGS. 1 to 3 and 19 show the underwater supply line 16, the exhaust pipe 20 and the recovery pipe 22.

The exhaust pipe 20 is generally made of metal, for example steel. The length of the exhaust pipe 20 is essentially limited by the depth of the sea bed 10. In practice, the exhaust pipe 20 has a length greater than 500 m and up to 5000 m, or more. The upper end 15 of the exhaust pipe 20 may or may not extend above the sea surface 12. In particular, the upper end 15 of the exhaust pipe 20 may extend by 1 m to 200 m above the sea surface 12 so as to be connected to the surface facility 14. The exhaust pipe 20 may be installed according to several configurations:

- a steel catenary riser (SCR) configuration shown in FIGS. 1 and 2,
- a hybrid catenary riser (HCR) configuration, not shown,
- a free standing hybrid riser (FSHR) configuration, shown in FIGS. 3 and 19,
- a free standing flexible riser (FSFR) configuration, not shown,
- a configuration combining two or more of the aforementioned configurations, or any other configuration considered suitable by a person skilled in the art.

It will be observed that the recovery pipe 22 may also be installed according to the aforementioned configurations. Thus, the exhaust pipe 20 may be installed according to a free standing hybrid riser configuration, while the recovery pipe 22 is installed according to a hybrid catenary riser configuration or else a steel catenary riser configuration.

In a steel catenary riser (SCR) configuration, shown in FIGS. 1 and 2, the exhaust pipe 20 is suspended by its upper end 15. The lower end 17 of the exhaust pipe 20 may either lie at the level of the sea bed 10, or, as shown in FIGS. 1 and 2, suspend the end of the underwater supply line 16 to which said exhaust pipe is connected, said end of the underwater supply line 16 having a curved shape rising toward the sea surface 12. In a steel catenary riser (SCR) configuration, the exhaust pipe 20 is subjected to large vertical movements caused by the heave movement of the surface facility 14 under the effect of the swell when said surface facility is floating. These vertical movements of the exhaust pipe 20, which in practice have an amplitude of some centimeters to several meters, cause severe, complex mechanical stresses in said exhaust pipe, notably at the level of the curved part and at the level of the contact zone between said exhaust pipe and the sea bed 10 when the lower end 17 of said exhaust pipe is resting on said sea bed. Thus, the mechanical characteristics and the weight of the exhaust pipe 20 must be distributed as homogeneously and uniformly as possible along said exhaust pipe. Since the exhaust pipe 20 is suspended on the surface facility 14, the weight of said exhaust pipe tends to oppose the buoyancy of said surface facility and pull it toward the bottom. Therefore a steel catenary riser (SCR) configuration will be unsuitable for large depths exceeding about 3000 m.

In a free standing hybrid riser (FSHR) configuration, as shown in FIGS. 3 and 19, the exhaust pipe 20 is suspended by its upper end 15 on a tensioning buoy 19 and is connected to the surface facility 14 via a first flexible pipe 21. In one embodiment the exhaust pipe 20 is connected to the surface facility 14 via a first umbilical 49 instead of the first flexible pipe 21. The first umbilical 49 comprises one or more fluid lines, and in particular, said first umbilical may be of the type of umbilical with integrated production lines (called IPB, for "Integrated Production Bundle"). The first flexible pipe 21, or the first umbilical 49, may be supported underwater by one or more uncoupling buoys 50 distributed uniformly or nonuniformly along said first flexible pipe or said first umbilical so as to limit the transmission of the movements due to the movements of the water, acting on the surface facility 14, to the exhaust pipe 20 and the recovery pipe 22. The uncoupling buoy or buoys 50 may be made of syntactic material or in the form of a metal tank. The uncoupling buoy or buoys 50 may notably make it possible to configure the first flexible pipe 21 or the first umbilical 49 in a configuration with one or more waves. The tensioning buoy 19 may be made of syntactic material. In one embodiment, the tensioning buoy 19 may be in the form of a metal tank containing air or a gas, for example nitrogen. This metal tank may be partially or fully floodable so as to be able to control the buoyancy of the tensioning buoy 19. In particular, the metal tank may be flooded during installation of the tensioning buoy 19 so as to facilitate entry thereof into the water and movement thereof under water. In general the tensioning buoy 19 is dimensioned so as to at least cancel the weight of the exhaust pipe 20 and/or recovery pipe 22, or even exert an additional tensile force, generally less than 500 kN. In a particular embodiment, the tensioning buoy 19 may have a central passage provided in the prolongation of the exhaust pipe 20, through which the first flexible pipe 21 or the first umbilical 49 extends. In this particular embodiment, the tensile force exerted by the tensioning buoy 19 is dimensioned so that the exhaust pipe 20 and/or the recovery pipe 22 can be inclined under the effect of a movement caused by the first flexible pipe 21 or the first umbilical 49 without any risk of damaging said first flexible pipe or said first umbilical against the upper edge of the tensioning buoy 19. The lower end 17 of the exhaust pipe 20 is arranged rotatably on a foundation 23 fixed on the sea bed 10 and connected to the end of the underwater supply line 16 via a second flexible or rigid pipe 25. Thus, the exhaust pipe 20, initially oriented vertically, is rotatable at its lower end 17 and can therefore be inclined under the effect of the sea current. When the exhaust pipe 20 is inclined, the tensioning buoy 19, exerting a vertical force on the upper end 15 of said exhaust pipe, tends to bring said exhaust pipe back into the vertical position. Thus, by inclining slightly with the variations of the sea current, the exhaust pipe 20 is subjected to far lower stresses than those to which it would be subjected if its orientation were fixed. This capacity for inclination, minimizing the stresses, makes it possible to supply an exhaust pipe 20 whose outside diameter may vary over its length, notably at the level of the separating chamber 26, which may have a diameter greater than that of the rest of said exhaust pipe 20. Moreover, the smaller the inside diameter of the upper part 27 of the exhaust pipe 20 located above the separating chamber 26, the more quickly the gas phase that is separated tends to escape to the surface facility 14. Thus, the shorter the residence time of the separated gas phase in the exhaust pipe 20, the less time there is for the gas phase to be cooled by heat exchange with the marine environment, and therefore the greater the decrease in the risk of formation of hydrate. It must, however, be taken into account that the inside diameter of the upper part 27 of the exhaust pipe 20 must not be reduced excessively to the point that it generates too much pressure loss by friction and therefore a natural drop in temperature of the gas phase by the Joule-Thomson effect. Moreover, when a device is used for heating the exhaust pipe 20:

the reduced dimensions of said exhaust pipe make it possible to supply a heating device comprising elements that also have reduced dimensions, the reduced volume and surface area to be heated make it possible to limit the energy costs.

This free standing hybrid riser (FSHR) configuration also has the advantage that it supplies an exhaust pipe 20 that is approximately vertical and straight, in contrast to a steel catenary riser (SCR) configuration in which the exhaust pipe 20 is curved. In a free standing hybrid riser (FSHR) configuration of this kind, illustrated in detail in FIG. 13, it is possible to arrange an injection line 34 coaxially, accurately in the separating chamber 26. The separated liquid phase or phases, descending after being propelled from the axial opening 39 of the free end 38 of the injection line 34, are distributed in a balanced fashion in the separating chamber 26 and in particular in a secondary separating zone 33 located below the axial opening 39, as will be explained in more detail hereunder. This balanced distribution allows further optimization of gas/liquid separation. The exhaust pipe 20, oriented approximately vertically, for example less than 5° of inclination from the vertical, induces regularity of the flow of the liquid phases, thereby maximizing the efficiency of the internal diverting devices, which will be described below.

Another advantage of this free standing hybrid riser (FSHR) configuration is that the weight is entirely supported by the foundation and the buoy, and therefore does not impose any stress on the surface facility 14. This free standing hybrid riser (FSHR) configuration is therefore suitable regardless of the depth of the sea bed 10.

In a hybrid catenary riser (HCR) configuration, not shown, the exhaust pipe 20 is suspended by its upper end 15 via a first flexible or rigid pipe connected to the surface facility 14. The lower end 17 of the exhaust pipe 20 is connected to the end of the underwater supply line 16 via a second flexible pipe. This configuration makes it possible to supply, just as with a free standing hybrid riser (FSHR) configuration, an exhaust pipe 20 that is approximately straight, and therefore has all the advantages resulting therefrom.

The exhaust pipe 20, as illustrated in FIG. 7, defines a separating chamber 26. The separating chamber 26 may extend on a part or on the whole of the length of said exhaust pipe 20. Since the length of the exhaust pipe 20 is essentially limited by the depth of the sea bed 10, it is possible to make use of this available dimension to extend the separating chamber 26 over a large length. In fact, the separating chamber 26 is designed so as to promote a particularly high ratio of length to diameter, for example a ratio of length to diameter greater than twenty-five, preferably a ratio of length to diameter greater than fifty. In particular, the separating chamber 26 may have a length from about a hundred meters to several hundred meters. Moreover, the maximum diameter of the exhaust pipe 20, notably at the level of the separating chamber 26, is dimensioned so as to allow conventional installation of the exhaust pipe 20, i.e. said diameter is dimensioned so that said exhaust pipe can pass through the pipe-laying equipment available on conventional pipe-laying vessels, in particular through the installation towers, tensioners, installation wells, in the same way that a conventional underwater riser would pass through. In certain particular cases, when the pipe-laying vessels do not allow laying of the separating chamber 26 by unwinding, but on the contrary said chamber is inserted between two parts of the underwater facility 18 and fixed to said two parts on the pipe-laying vessel, said two parts being or not being installable by unwinding, said separating chamber may advantageously have smaller dimensions so that it can be transported lying on the deck of the pipe-laying vessel or on a barge. In such a case the separating chamber will generally have a length of less than 50 m. The separating chamber 26 has an upper end 28 and an opposite lower end 30. The separating chamber 26 also has an intermediate zone 32.

In a steel catenary riser (SCR) configuration, as presented in FIG. 1 or 2, and when the separating chamber 26 extends over only a part of the exhaust pipe 20, said separating chamber 26 may be located essentially in the suspended part of the exhaust pipe 20, or else it may rest partially on the sea bed 10. Depending on the position of the separating chamber 26 in the exhaust pipe 20, the intermediate zone 32 may have a curved or a straight shape. The separating chamber 26 may have a lower end 30, illustrated in more detail in FIG. 4, extending in hairpin fashion relative to the intermediate zone 32 at the level of a junction 36, at the level of which the underwater supply line 16 connects the intermediate zone 32 of the separating chamber 26 to be extended inwards via the injection line 34. According to another embodiment of the invention, not shown, a pipe joint is substituted for the lower end 30, said pipe joint being connected at the level of the junction 36 by means of a connector provided for this purpose. This pipe joint may be made of a flexible pipe element, of the type comprising an impervious sheath and metal armor, or may simply be the prolongation of the recovery pipe 22.

Generally, regardless of the configuration, the section of pipe connecting the lower end 30 of the separating chamber 26 to the lifting pump 24 is either a flexible pipe joint, or the prolongation of the exhaust pipe 20, or the prolongation of the recovery pipe 22.

Inside the intermediate zone 32, the injection line 34, which has a tubular wall, extends, generally approximately coaxially, but not necessarily so, in the prolongation of the underwater supply line 16, as shown in FIGS. 7 to 9, 12, 13 and 15. The intermediate zone 32 then has an annular space 35 extending between the outside wall of the injection line 34 and the inside wall of the separating chamber 26.

When the intermediate zone 32 is curved, in the case of a steel catenary riser (SCR) configuration, it has a natural curvature mainly resulting from the deformation of the exhaust pipe 20 under its own weight, said exhaust pipe being suspended by its upper end 15 and resting at its lower end 17 on the sea bed or supported on the end of the underwater supply line 16, producing a rising curvature in the direction of the sea surface 12.

As shown in FIGS. 7 to 9, centering blocks 29, or spacers, may be arranged in the intermediate zone 32, and more particularly in the secondary separating zone 33, around the injection line 34 so as to hold the injection line in position at the center of the separating chamber 26, notably when said intermediate zone is curved in the case of a steel catenary riser (SCR) configuration. The centering blocks 29, illustrated in detail in FIGS. 8 and 9, comprise one or more orifices 37 allowing circulation of the liquid phase or phases along the secondary separating zone 33.

In practice, the underwater supply line 16 is connected to the separating chamber 26, whereas the injection line 34, which prolongs said underwater supply line, is an independent element integral with the separating chamber 26 in which said injection line extends.

The separating chamber 26 extends essentially vertically, and this is more precisely the case with the part of the intermediate zone 32 into which the injection line 34 opens. The latter has, at a free end 38, an axial opening 39, from which the multiphase hydrocarbon mixture is propelled.

Thus, as shown in FIG. 7, the intermediate separating zone 32 may be subdivided into:
  a primary separating zone 31 extending from the free end 38 of the injection line 34 to the upper end 28 of the separating chamber 26; and
  the secondary separating zone 33, mentioned above, extending from the free end 38 of the injection line 34 to the lower end 30 of the separating chamber 26.

Thus, the axial opening 39 of the injection line 34 opens into the separating chamber 26 so as to propel the multiphase hydrocarbon mixture into said primary separating zone 31, and therefore allow at least a part of the gas phase to escape to the upper end 28 of the separating chamber 26, whereas said at least one liquid phase drops back by gravity under the effect of its own weight in the direction toward the lower end 30 of the separating chamber 26, and is thus evacuated to the secondary separating zone 33. The first gas/liquid separation may be partial. Thus, at the end of the first gas/liquid separation, it is possible that a part of the gas phase may remain trapped in the liquid phase or phases. Therefore the secondary separating zone may not contain only the liquid phase or phases, but a multiphase hydrocarbon mixture resulting from the first gas/liquid separation, hereinafter called multiphase hydrocarbon mixture separated first. A second gas/liquid separation is then carried out in the secondary separating zone, by decanting. The second gas/liquid separation may be partial. Thus, at the end of the second gas/liquid separation, it is possible that a part of the gas phase may remain trapped in the liquid phase or phases. Therefore at the outlet of the secondary separating zone the fluid may not contain only the liquid phase or phases, but a multiphase hydrocarbon mixture resulting from the second gas/liquid separation, hereinafter called multiphase hydrocarbon mixture separated secondly.

In practice, the distance between the free end 38 of the injection line 34 and the lower end 30 of the separating chamber 26 is configured so as to allow a residence time of the multiphase hydrocarbon mixture that is long enough for optimal coalescence of the bubbles of gas phase. This distance between the free end 38 of the injection line 34 and the lower end 30 of the separating chamber 26 is preferably greater than 10 m. Moreover, the inside diameter of the secondary separating zone 33 may be greater than that of the primary separating zone 31 so as to increase the area of the annular space 35 of said secondary separating zone and thus reduce the flow velocity of the liquid phase or phases. Conversely, in particular cases of gas extraction, for which the gas flow rate is greater than the liquid flow rate, the inside diameter of the primary separating zone 31 may be greater than that of the secondary separating zone 33 so as to increase the cross-sectional area of the primary separating zone through which the gas phase escapes and thus reduce the flow velocity of the gas phase and limit potential entrainment of the fine droplets of liquid phases with the gas.

Figure 13:
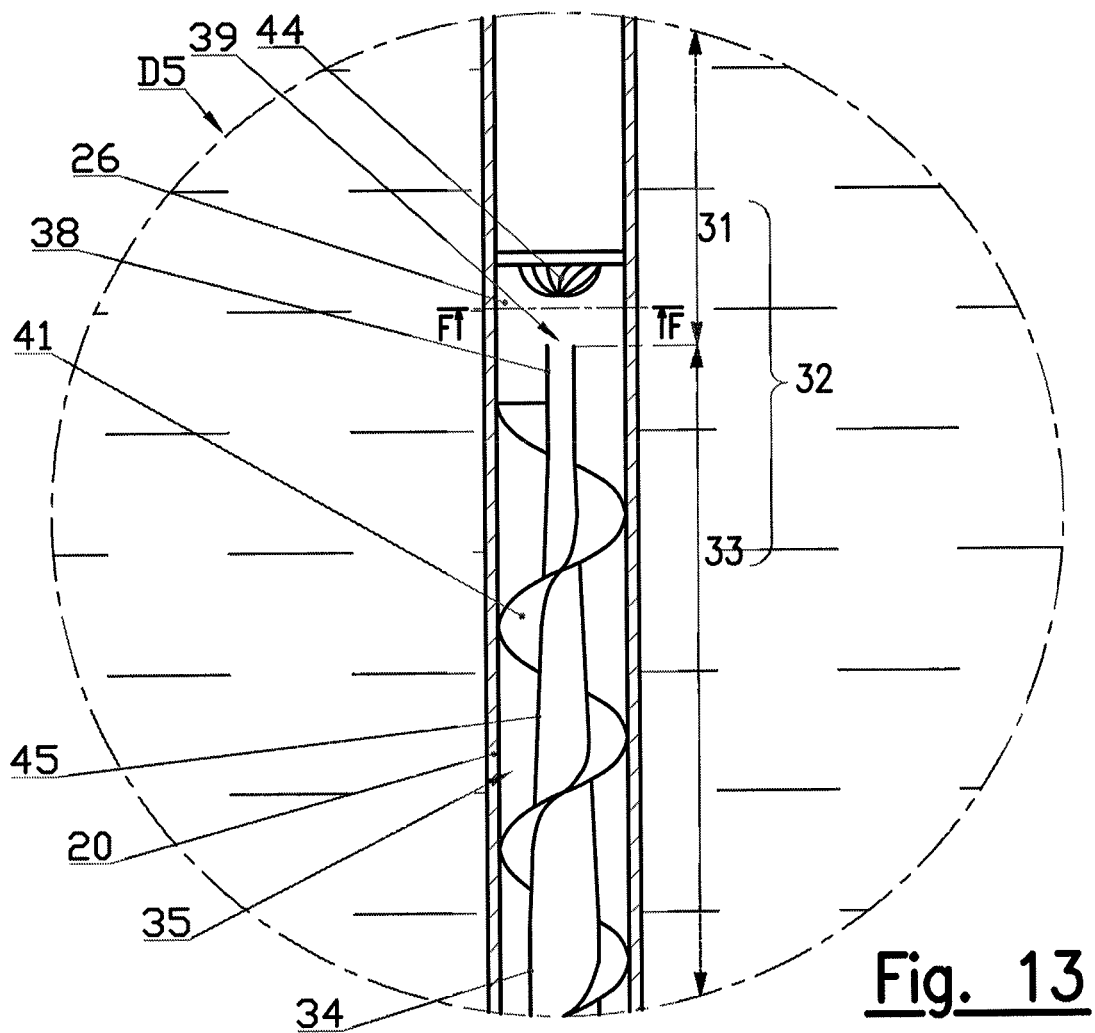
FIG. 13 is a schematic view of another detail D5 indicated in FIG. 3, according to a first embodiment.
Figure 15:
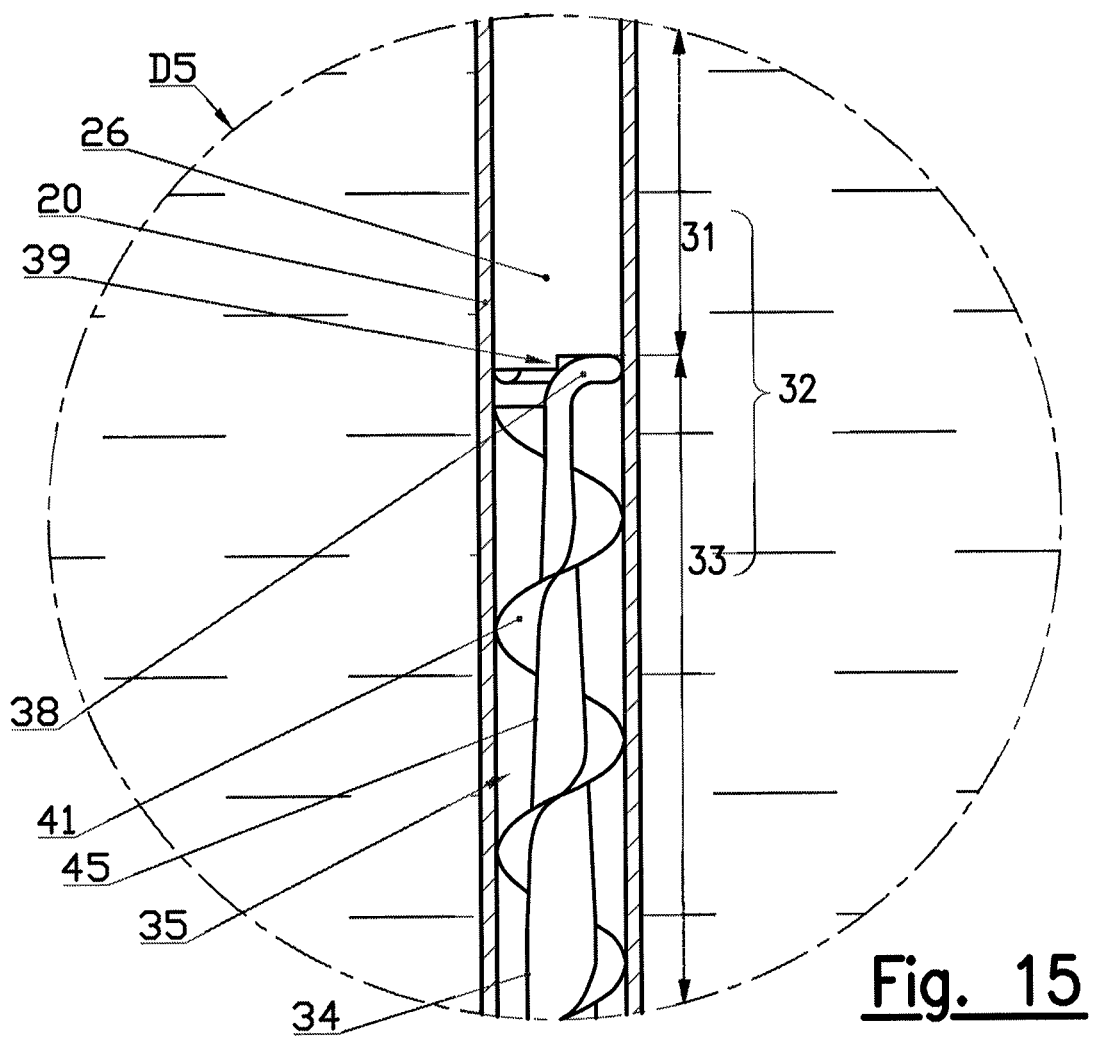
FIG. 15 is a schematic view of said other detail D5 indicated in FIG. 3, according to a second embodiment.

According to embodiments illustrated in FIGS. 13 and 15, the diameter of the injection line 34 may vary over its length. Thus, a reduction of the inside diameter 45 at the level of the free end 38 of the injection line 34, also called throttling, may be provided either over a small length, or over a large length. In practice, large lengths will be preferred, for example throttling lengths measuring several tens of meters, in proportions of about 300 times the inside diameter of the free end 38 of the injection line 34 so as to stabilize the flow conditions of the multiphase hydrocarbon mixture. For example, a throttling length of 60 m will be suitable for an axial opening 39 of the free end 38 of the injection line 34 having a diameter of 8 inches (about 0.203 m), and for a diameter of the underwater supply line 16 of 10 inches (about 0.254 m). The reduction of the inside diameter 45 may, in particular, be begun from the origin of the injection line 34.

When the injection line 34 is not rectilinear, it is advantageously curved and without sharp angles, the radius of curvature being calculated so as to minimize the pressure losses in said injection line, and thus allow the recovery of the multiphase hydrocarbon mixture from the hydrocarbon deposit to be maximized. For example, the injection line 34 will have a helicoid shape. The pitch of the helicoid may then be of 2 m or more. The radius of curvature may be for example 0.3 m for an inside diameter of the separating chamber 26 of 16 inches (about 0.406 m) and a diameter of the injection line 34 of 6 inches (about 0.152 m). Furthermore, based on the inside diameter of the separating chamber 26, the outside diameter of the injection line 34 is calculated so as to be minimal and thus obtain a volume of the secondary separating zone 33 that maximizes the residence times of the multiphase hydrocarbon mixture separated first. In practice, the minimum diameter of the injection line 34 is fixed by an erosion criterion. For example, for an injection line 34 made of carbon steel, the flow velocity of the multiphase hydrocarbon mixture in said injection line must remain below 30 m/s. The diameter of the injection line 34 will then be calculated as a function of the field data and notably as a function of the flow rate of the hydrocarbon deposit. For an injection line 34 made of stainless steel, the flow velocity of the multiphase hydrocarbon mixture in said injection line 34 may be up to 50 m/s.

According to an advantageous embodiment, the inside diameter of the injection line 34 may moreover be dimensioned in order to promote, inside said injection line, an annular type of flow of the multiphase hydrocarbon mixture, and thus make it possible, at the free end 38 of said injection line, to propel the liquid phase or phases radially, this radial propulsion making it possible to optimize gas/liquid separation. In practice, a flow velocity of the multiphase hydrocarbon mixture in said injection line 34 above 10 m/s will promote the formation of annular flow conditions. The diameter of the injection line 34 will then be calculated as a function of the field data and notably as a function of the flow rate of the hydrocarbon deposit so as to obtain a flow velocity of the multiphase hydrocarbon mixture greater than or equal to 10 m/s.

According to an advantageous embodiment that is not illustrated, a flow device is arranged inside the injection line 34 as shown in FIG. 13, and it is configured to generate an annular flow of the multiphase hydrocarbon mixture inside said injection line. The flow device may in particular be in the form of a helicoid plate, or else a series of fins, fixed on the inside wall of the injection line 34 and configured to induce cyclonic motion of the multiphase hydrocarbon mixture.

The axial opening 39 is generally formed by truncation of the injection line 34 by a plane approximately orthogonal to the axis of said injection line, and according to certain variants said plane may be inclined relative to the axis of said injection line so as to obtain a beveled end.

In certain embodiments, the axial opening 39 of the injection line 34 opens axially toward the primary separating zone 31, so as to propel the multiphase hydrocarbon mixture into said primary separating zone, and therefore allow at least a part of the gas phase to escape to the upper end 28 of the separating chamber 26, whereas said at least one liquid phase drops back by gravity under the effect of its own weight in the direction toward the lower end 30 of the separating chamber 26, and is thus evacuated to the secondary separating zone 33.

Figure 16:
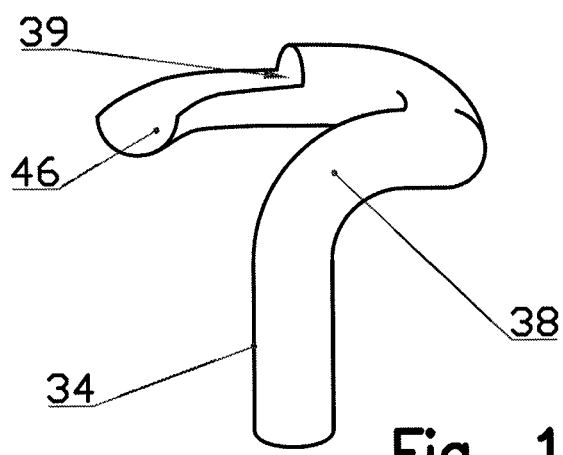
FIG. 16 is a schematic perspective detail view of an element illustrated in FIG. 15.

In an embodiment shown in FIGS. 15 and 16, the free end 38 of the injection line 34 is curved so as to propel the multiphase hydrocarbon mixture tangentially onto the inside walls of the separating chamber 26 so as to create a helicoidal flow along said walls. Furthermore, as shown in FIGS. 15 and 16, the free end may comprise, beyond its axial opening 39, a guide support 46 configured to guide the multiphase hydrocarbon mixture in its tangential motion to the inside walls of the separating chamber 26, while allowing gas/liquid separation on the upper part of the multiphase hydrocarbon mixture flowing on said guide support. The guide support may in particular take the form of a half-tube whose convexity is oriented toward the secondary separating zone.

In other embodiments that are not illustrated, the free end 38 of the injection line 34 splits into several short sub-lines arranged so as to generate, for each of said sub-lines, a jet of multiphase hydrocarbon mixture oriented in a predefined direction promoting gas/liquid separation. The jets may, for example, be oriented so that the multiphase hydrocarbon mixture is propelled tangentially to the inside walls of the separating chamber 26 so as to create a helicoidal flow along said walls. Only one, or several of the sub-lines may also be equipped with a guide support 46 like that described above.

In the embodiments for which the multiphase hydrocarbon mixture is propelled tangentially to the inside walls of the separating chamber 26, the shape and the dimensions of the injection line 34 will preferably be selected so that the flow of the multiphase hydrocarbon mixture inside said injection line 34 is not annular.

Since the separating chamber 26 may be of considerable length, as explained above, the length of the secondary separating zone 33, and necessarily the length of the injection line 34, may be dimensioned so as to provide a buffer zone between the free end 38 of the injection line 34 and the nominal level of the gas/liquid interface in the separating chamber 26 in nominal operation. The buffer zone is configured to store the brief surpluses of liquid phases in slug flow conditions. In any case, the length of the separating chamber 26 is preferably dimensioned so that, in the most unfavorable cases of slug flow, the liquid phases cannot leave said separating chamber via its upper end 28.

In nominal operation, as illustrated in FIG. 7, the gas/liquid interface 42 is positioned at the level of the secondary separating zone 33, at a predetermined distance "d" from the free end 38 of the injection line 34. The predetermined distance "d" is preferably dimensioned so that the buffer volume of the buffer zone is between 5 m$^3$ and 20 m$^3$. In practice, the predetermined distance "d" is at least greater than 10 m, generally greater than 50 m. Monitoring the delivery of the lifting pump or pumps 24 makes it possible to control the position of the true level of the gas/liquid interface 42 in the separating chamber 26 so that it coincides with the desired nominal level of the gas/liquid interface 43.

One or more sensors, not shown, arranged inside or outside the underwater facility 18, are configured for measuring in real time, or at regular intervals, the actual level of the gas/liquid interface 42 in the separating chamber 26. This sensor or these sensors may, for example, be pressure sensors, arranged below the nominal level of the gas/liquid interface 43 and configured to determine the actual level of said gas/liquid interface from the measured pressure exerted by the column of liquid located between said gas/liquid interface and said pressure sensor. A control unit is configured for:

increasing the delivery of the lifting pump or pumps 24 when the actual level of the gas/liquid interface 42 is above the desired nominal level of the gas/liquid interface 43, decreasing the delivery of the lifting pump or pumps 24 when the actual level of the gas/liquid interface 42 is below the desired nominal level of the gas/liquid interface 43.

One or more pressure sensors are preferably located at the lower end 30 of the separating chamber 26, and/or upstream of the lifting pump or pumps 24. In particular, the pressure sensors installed in series with the lifting pumps in the conventional installation schemes may in particular be used for measuring the true level of the gas/liquid interface 42 in addition to their normal use so as to avoid the installation of an additional pressure sensor on the underwater facility 18.

The use of a pressure sensor has the advantage, relative to optical sensors, that its operation does not deteriorate in a dirty environment such as that of hydrocarbons, in contrast to the optical sensors, which are liable to fouling and for which measurement may be disturbed in the presence of turbulent flows or foam.

The use of one or more secondary pressure sensors, arranged in the upper part of the separating chamber 26, preferably at the level of the upper end 28, may make it possible to supplement pressure measurement by calculating the pressure difference between this or these secondary pressure sensors and the pressure sensor or sensors arranged below the nominal level of the gas/liquid interface 43. The larger the measured pressure difference, the more accurately the actual level of the gas/liquid interface 42 can be determined. Therefore the greater the height of the column of liquid phases, located upstream of the pressure sensor arranged below the nominal level of the gas/liquid interface 43, the larger the pressure difference will be. Thus, the length of the separating chamber 26 is therefore determined so as to make it possible, in nominal operation, to have a height of the column of liquid phases at least equal to 20 m.

In particular, the pressure sensors installed in series with the inlet valve of the exhaust pipe 20, and arranged at the level of the surface facility 14 in the conventional installation schemes, may be used for measuring the true level of the gas/liquid interface 42 in addition to their normal use so as to avoid the installation of an additional pressure sensor on the underwater facility 18.

In particular, the provision of additional sensors generally requires drilling into the pipes locally for fixing them. Now, this drilling tends to create weak points on the pipes, which give rise to major security risks with regard to exposure of said pipes to operating pressures, to movements of twisting and bending, as well as to vibrations, which are considerable.

Furthermore, the great height of the column of liquid phases generates a high pressure at the intake of the lifting pump or pumps 24. This high pressure gives rise to a phenomenon of back-condensation of the gas bubbles entrained with the liquid phases. Back-condensation means that the gas re-liquefies under the effect of the high pressure. Thus, the apparent volume fraction of gas mixed in the liquid phase or phases at the intake of the lifting pump or pumps 24 is reduced significantly. Furthermore, the more the apparent volume fraction of gas decreases, the more the efficiency of the lifting pump or pumps 24 increases. In fact, the more gas is mixed with the liquid phase or phases, the more the mixture is compressible, and the more the efficiency of the lifting pump or pumps 24 decreases.

Moreover, the column of liquid phases tends, under the action of gravity, to flow through the lifting pump or pumps 24 and actually increases the efficiency of said lifting pumps. Thus, a wide range of conventional submersible lifting pumps may be selected.

Thus, when foam forms at the level of the secondary separating zone 33, the distance between the upper part of the foam and the lifting pump or pumps 24 is such that if a column of foam of this size were to form, the foam would collapse into liquid under its own weight. Thus, it is impossible for foam to reach the lifting pump or pumps 24 and be aspirated by the latter, thus avoiding the risks of unpriming, of damage or even of destruction of said lifting pumps.

In an advantageous embodiment of the invention, an upstream pressure sensor is installed upstream of or within the injection line 34. This upstream pressure sensor makes it possible to detect a potential temporary obstruction of the buffer zone. In such a case of temporary obstruction, the actual level of the gas/liquid interface 42 as illustrated in FIG. 7 would be located above the free end 38 of the injection line 34. Such a case of obstruction is undesirable and causes degradation of the performance of gas/liquid separation. Therefore when the upstream pressure sensor detects a case of obstruction of the buffer zone, the control unit may:

either increase the delivery of the lifting pump or pumps 24 in consequence, or, in certain cases when there is a risk of damage of the underwater facility 18, stop devices located upstream or downstream of said underwater facility as well as stopping the lifting pump or pumps 24.

Figure 17:
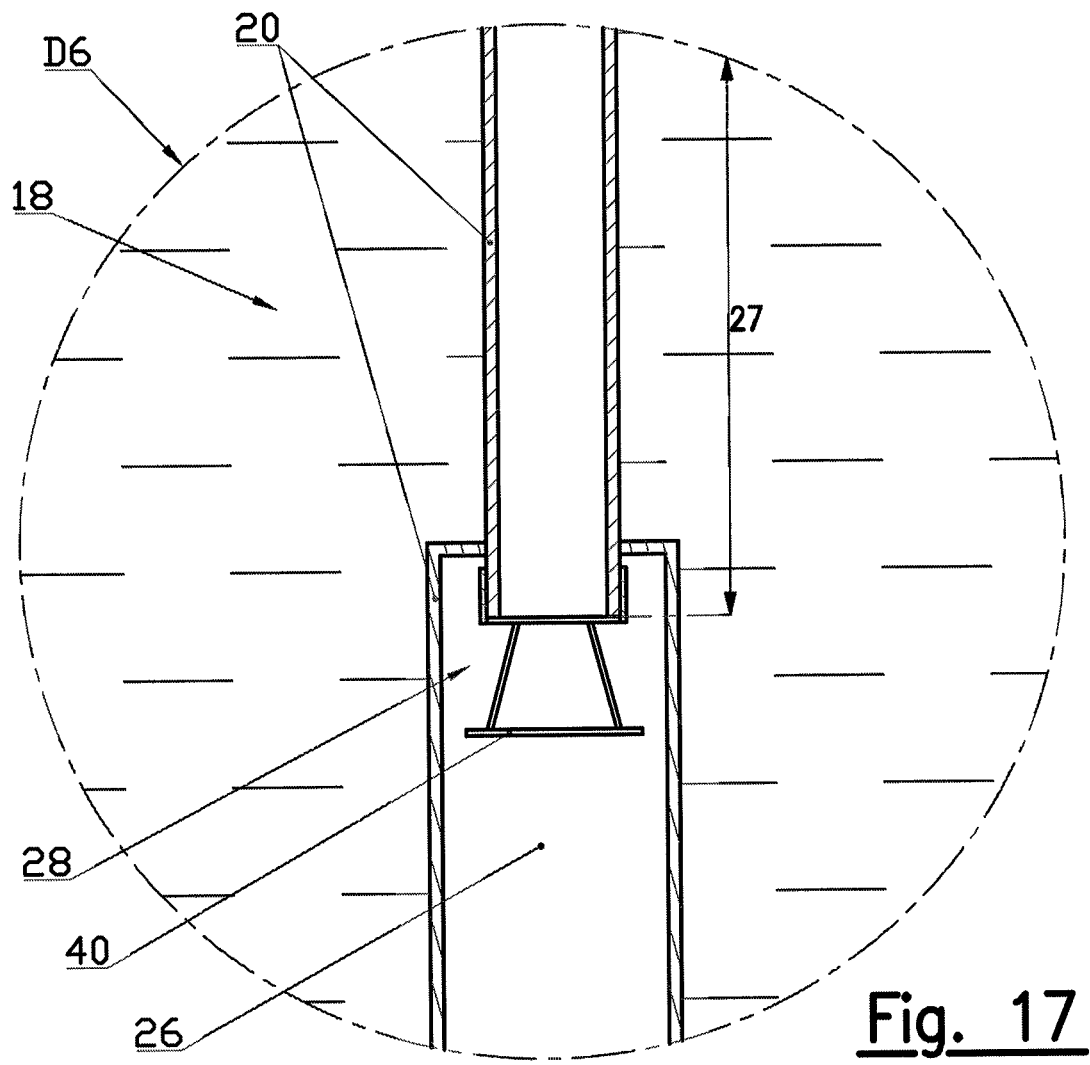
FIG. 17 is a schematic view of yet another detail D6 indicated in FIG. 3.
Figure 18:
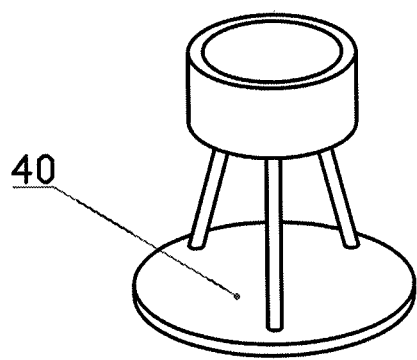
FIG. 18 is a schematic perspective detail view of an element illustrated in FIG. 17.

In the case of a free standing hybrid riser (FSHR) configuration, as shown in FIGS. 3 and 19, and when the diameter of the upper part 27 of the exhaust pipe 20 is less than the diameter of the separating chamber 26, the height of the primary separating zone must be sufficient for the liquid phase or phases propelled via the free end 38 of the injection line 34 to drop down before reaching the zone in which there is a narrowing of diameter. In fact, in the zone in which there is a narrowing of diameter, the separated gas phase is accelerated. In the case when the liquid phase or phases propelled would reach the zone in which there is a narrowing of diameter, the separated gas phase thus accelerated would risk entraining fine droplets of liquid phases in the exhaust pipe 20 to the surface facility 14. The height of the primary separating zone is generally greater than 2 m, preferably greater than 10 m. To eliminate this risk, notably when the height of the primary separating zone is less than 10 m, an upper deflecting device 40, as shown in FIGS. 17 and 18, may be arranged in the primary separating zone. The upper deflecting device 40 is configured to impose an indirect path, preferably with a baffle plate, on the separated gas phase. The upper deflecting device 40 may, moreover, be configured so that it also allows potential fine droplets of liquid phases to drop down, in the separating chamber 26, which would have been entrained in the upper part 27 of the exhaust pipe 20 but which would have condensed on the walls of said exhaust pipe before reaching the surface facility 14.

According to a particularly advantageous embodiment of the invention illustrated in FIGS. 13 and 15 that is particularly suitable for the hybrid catenary riser (HCR) or hybrid free standing riser (FSHR) configurations, a helicoidal deflecting device 41 in the form of a plate arranged as a helix around the injection line 34, extends inside the secondary separating zone 33 of the separating chamber 26. In practice, on dropping down, the liquid phase or phases will flow over the upper face of the plate. At the same time, the rest of the gas phase still mixed with the liquid phase or phases in the multiphase mixture separated first, on separating from said liquid phase or phases, tends to rise until it comes into contact with the lower face of the plate. Thus, a sheet of gas is created under the lower face of the plate creating a path for preferential passage to lift it from the separated gas phase to the primary separating zone 31 while minimizing the risk of re-entrainment of said separated gas phase by the liquid phase or phases descending to the bottom of the secondary separating zone 33. The helicoidal deflecting device 41 is configured to:

- limit the height of fall of the liquid phase or phases propelled via the free end 38 of the injection line 34 and therefore limit the risk of foaming;
- maximize the free surface of the liquid phase or phases flowing along the plate arranged as a helix, gas/liquid separation taking place at the level of said free surface, the efficiency of said gas/liquid separation increasing with the dimensions of said free surface;
- amplify gas/liquid separation by centrifugation of the multiphase hydrocarbon mixture separated first;
- when the plate extends over the whole width of the annular space 35, replace the centering blocks 29 that tend to obstruct the flow of the liquid phase or phases in the secondary separating zone 33, thus decreasing the performance of gas/liquid separation and appreciably increasing the risk of foaming.

The plate may be arranged orthogonally, or inclined, relative to the outside surface of the injection line 34, and preferably inclined so that the periphery of the plate is positioned above the internal portion. The plate may extend over the whole width of the annular space 35 or on only a portion. The pitch of the helicoidal deflecting device 41 may be continuous or variable and may for example decrease as we approach the lower end 30 of the exhaust pipe 20. The helix pitch has a dimension configured to allow formation of the sheet of gas and therefore allow the separated gas phase to rise in counter-current from the liquid phase or phases. Preferably, the helicoidal deflecting device 41 can have a helix pitch of at least 1 m. The helicoidal deflecting device 41 may comprise several helical plates arranged in parallel or else may comprise several plates arranged in series and thus forming several helical segments.

According to a particular embodiment of the invention, not shown, one or more in-line separators may be installed at the level of the recovery pipe 22, more generally upstream of the lifting pump or pumps 24, in order to separate the residual gas phase from the multiphase hydrocarbon mixture separated secondly. The in-line separator is in the form of a cylindrical body arranged on the axis of the recovery pipe 22. The in-line separator comprises a means for imparting a rotating motion to the multiphase hydrocarbon mixture separated secondly. By the centrifugal effect, the liquid phase or phases that are more dense than the gas phase will be flattened against the walls of the cylindrical body, whereas the less dense gas phase will be expelled from the liquid phase or phases and will end up in a central zone of said cylindrical body. The in-line separator then comprises a gas phase withdrawal line, a first part of which extends coaxially with the cylindrical body so that the gas phase from the central zone of said cylindrical body goes into said line. The diameter of the withdrawal line, generally less than half the diameter of the cylindrical body, is preferably dimensioned so as to withdraw, in addition to the gas phase located in the central zone of said cylindrical body, a thin layer of liquid phase so as to ensure that the liquid phase leaving the in-line separator is purified of the gas phase to the maximum. The withdrawal line then comprises a second part extending orthogonally to the periphery of the cylindrical body and passing through said cylindrical body. The first and second parts of the withdrawal line are connected to one another by an elbow. For their part, the liquid phase or phases flow around the withdrawal line to the recovery pipe 22. The second part of the withdrawal line is then connected to the exhaust pipe 20 for reinjection of the recently separated gas phase, or else directly to the surface facility 14. In this particular embodiment comprising an in-line separator, it is possible to minimize the dimensions of the exhaust pipe 20, and notably of the separating chamber 26, without degrading the overall gas/liquid separation. In fact, minimizing the dimensions of the exhaust pipe 20 tends to degrade the first and the second gas/liquid separation that are carried out at the level of the primary 31 and secondary 33 separating zones. The addition of an in-line separator then makes it possible, by a third gas/liquid separation, to compensate the degradation of the first and second gas/liquid separations. The use of an in-line separator arranged downstream of the lower end 30 of the separating chamber 26 is particularly advantageous, in that the height of the column of liquid phases in the secondary separating zone of said separating chamber generates:

- a sufficient pressure at the level of said in-line separator to allow natural flow of the multiphase hydrocarbon mixture inside the in-line separator;
- an operating pressure at the level of said in-line separator above the operating pressure at the level of the primary separating zone of the separating chamber 26 to allow reinjection of the gas phase from the third gas/liquid separation inside the exhaust pipe 20, and thus avoid the risk of the gas phase from the first and second gas/liquid separation escaping via the withdrawal line and being directed to the in-line separator. In such a configuration, the separating chamber 26 notably allows absorption of any plugs of liquid phases in slug flow conditions and generates continuous conditions without slug flow at the inlet of the in-line separator, as slug flow conditions are incompatible with proper operation of said in-line separator.

According to an advantageous embodiment, the exhaust pipe 20, the recovery pipe 22 as well as any other equipment of the invention may be equipped, partly or wholly, with direct or indirect active heating means. Said active heating means may comprise electric heating cables arranged around the exhaust pipe 20, and/or the recovery pipe 22 and/or any other equipment, and configured for heating the liquid and gaseous phase or phases inside said pipes or said equipment. According to one embodiment, the active heating means may comprise a device for inducing a current in the metal body of the exhaust pipe 20, and/or of the recovery pipe 22 and/or of any other equipment so as to create, at the level of said pipe or said equipment, release of heat by the Joule effect and thus heat the liquid and gaseous phase or phases inside said pipes or said equipment. The active heating means may also comprise means for measuring the temperature of the liquid and gas phases. These measuring means may, for example, be in the form of optical fibers arranged around the exhaust pipe 20, and/or the recovery pipe 22 and/or any other equipment. A temperature control unit may then be configured for regulating the temperature of the liquid and gas phases to a desired value. Keeping the liquid and gas phases at a desired temperature makes it possible to avoid the formation of solid hydrates, ice, wax, etc., notably during the phases of production shutdown.

Figure 14:
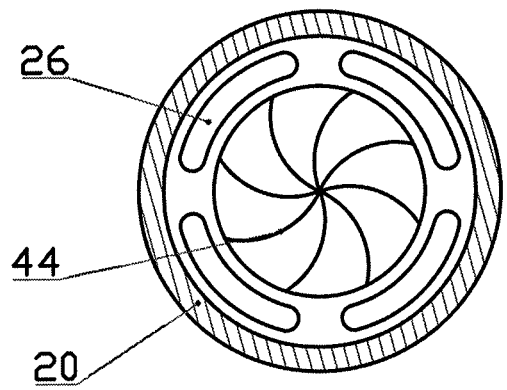
FIG. 14 is a schematic cross-sectional view in plane F-F of a detail shown in FIG. 13.

Advantageously, as shown schematically in FIGS. 13 and 14, the separating chamber 26 is equipped with one or more primary diverting devices 44, mounted in the primary separating zone. According to a particular embodiment, the primary diverting devices 44 are movable. They consist, for example, of propellers having blades of various shapes, curved or else twisted. According to another embodiment, the primary diverting devices 44 are mounted in a fixed position inside the separating chamber 26 in the prolongation of the free end 38 of the injection line 34. These primary diverting devices 44 make it possible to promote gas/liquid separation.

FIGS. 8 and 9 illustrate, respectively, the cross sections of the separating chamber 26 shown in FIG. 7, one at the level of the secondary separating zone 33, the other at the level of the primary separating zone 31.

Thus, FIGS. 8 and 9 show the injection line 34 installed coaxially inside the separating chamber 26. For example, an injection line 34 will be selected with a diameter close to half that of the separating chamber 26 at the level of the intermediate zone 32, and more precisely, at the level of the secondary separating zone 33. Thus, the diameter of the lower end 30 of the separating chamber 26 is generally calculated so that the area of the cross section that it defines is less than or equal to the difference of the cross-sectional areas of the separating chamber 26 at the level of the intermediate zone 32, and of the injection line 34, and more precisely at the level of the secondary separating zone 33.

Thus, the multiphase hydrocarbon mixture is injected vertically toward the upper end 28 of the separating chamber 26 through the axial opening 39, at the free end 38 of the injection line 34. In addition, the lifting pump or pumps 24 are switched on. Thus, at the level of the free end 38, the gas phase and the liquid phase or phases tend to separate, and owing to the action of gravity, the liquid phase or phases flow in the annular space 35, toward the sea bed 10, then reach the lower end 30 and are propelled by the lifting pump or pumps 24 inside the recovery pipe 22, whereas conversely, the gas phase tends to escape, opposite the sea bed, through the upper end 28 then from the exhaust pipe 20 forming the extension thereof.

Thus, owing to the lifting pump or pumps 24, it is easy to adjust the actual gas/liquid interface 42 illustrated in FIG. 7, between the gas phase and the liquid phase or phases inside the separating chamber 26. The vertical position of this actual gas/liquid interface 42 with respect to the free end 38 is in fact decisive for optimizing gas/liquid separation. Furthermore, sensors connected to electric and/or optical cables are employed so as to be able to control the lifting pump or pumps 24. These sensors make it possible to determine either the actual level of the gas/liquid interface 42, or the pressure at the level of the lifting pump or pumps 24, which provides evidence of the height of the column of liquid phases.

Figure 20:
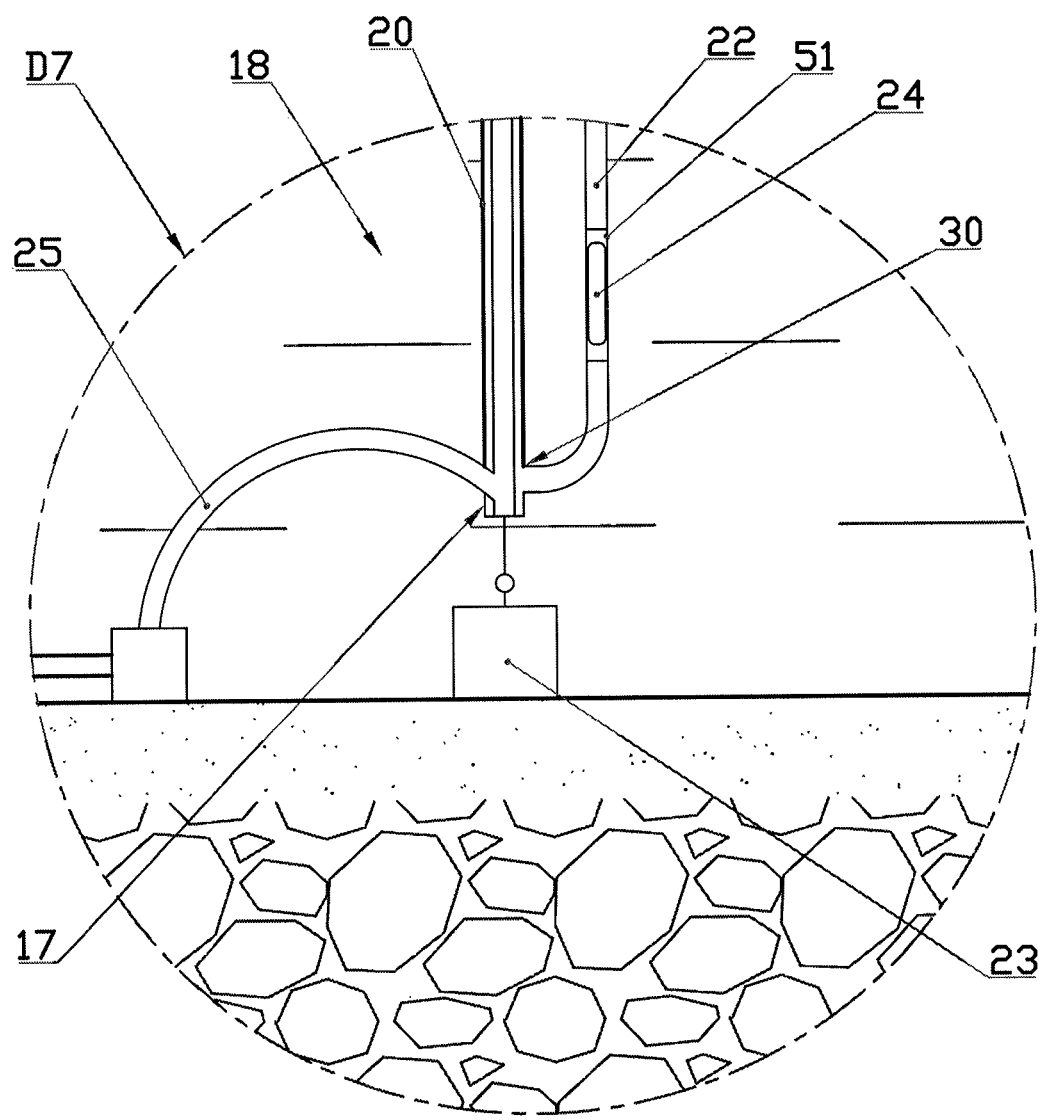

As an example, the separating chamber 26 is arranged inside a flexible pipe, or a hybrid, flexible and rigid, pipe assembly, for example having a diameter of twelve inches, and is installed conventionally in catenary fashion. Regarding the injection line 34, preferably rigid but potentially flexible, it has for example a diameter of six inches. Such an arrangement may be implemented at the surface at the level of a pipe-laying vessel, and the assembly may then be deployed conventionally through the moonpool of said pipe-laying vessel. The same applies to the underwater supply line 16, the recovery pipe 22 and the exhaust pipe 20. However, the lifting pump or pumps 24 are preferably maintained in a fixed position on the sea bed 10 by means of an anchoring pile. In an embodiment shown in FIGS. 19 and 20, the lifting pump 24 may be in the form of a vertical pump. Vertical pump means a pump that transfers a fluid from an intake orifice located on the lower part of said pump to an orifice located on the upper part of said pump. Vertical pumps are generally used inside a well. In particular, the vertical pump may be of the electric submersible pump type (ESP), arranged vertically inside the recovery pipe 22. The recovery pipe 22 may in particular comprise a pipe section 51 that can be disconnected from the rest of said recovery pipe, with the vertical pump arranged inside in such a way that it is possible to remove said vertical pump for carrying out maintenance. The pipe section 51 is assembled on the rest of the recovery pipe via a flange assembly, via a quick connector assembly of the UCON® type, or via any other means of assembly considered suitable by a person skilled in the art. In particular, when the underwater facility 18 for gas/liquid separation comprises several recovery pipes 22, the latter may comprise isolating valves so as to stop the operation of one or more of said recovery pipes 22 for carrying out maintenance of the lifting pump 24 associated therewith, while operation of the other recovery pipes 22 is maintained. In an embodiment that is not illustrated, the vertical pump may be provided in the prolongation of the lower part of the recovery pipe 22, said vertical pump being directly assembled on said recovery pipe and the exhaust pipe 20 via a flange assembly, via a quick connector assembly of the UCON® type, or via any other means of assembly considered suitable by a person skilled in the art.

As shown in FIG. 2, the separating chamber 26 is held suspended above the sea bed 10. According to another embodiment, the assembly of exhaust pipe 20 and recovery pipe 22 may be suspended.

Figure 4:
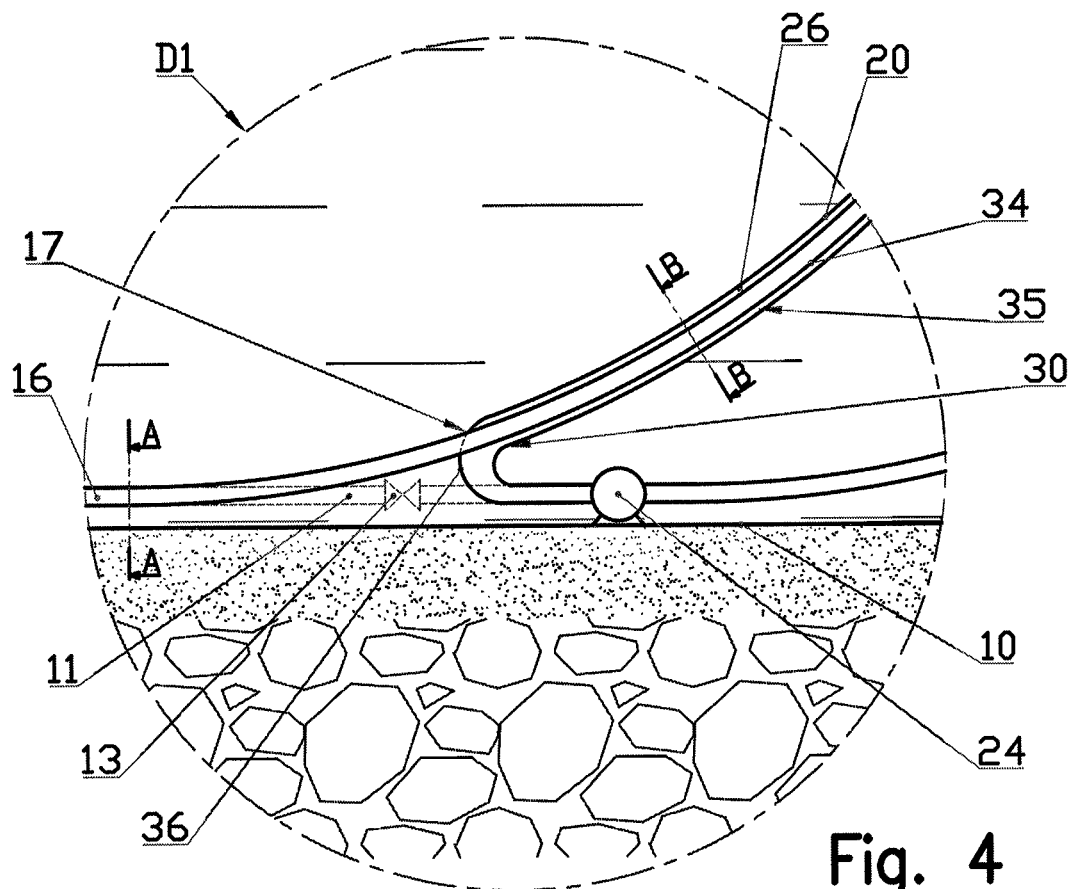
FIG. 4 is a schematic view of a detail D1 indicated in FIG. 1 illustrating an element of the underwater facility according to the first embodiment.
Figure 5:
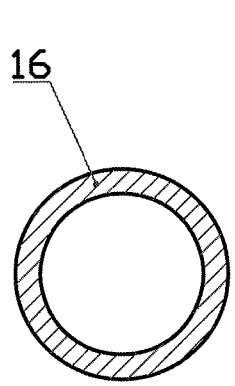
FIG. 5 is a schematic cross-sectional view in plane A-A of a detail illustrated in FIG. 4.
Figure 6:
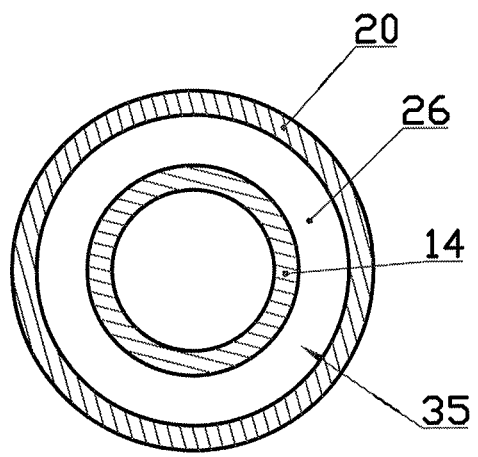
FIG. 6 is a schematic cross-sectional view in plane B-B of another detail illustrated in FIG. 4.

According to another embodiment, shown in FIG. 4, the bottom part of the separating chamber 26 rests on the sea bed 10. Thus, in deep sea, the temperature is close to 4° C., and therefore heating cables may be employed to reduce the possibility of formation of the plugs of paraffin, ice or hydrates.

FIGS. 1 to 4 and 19 show the vertical separating chamber 26 having an upper end 28 prolonged by the upper part 27 of the exhaust pipe 20 and opposite to a lower end 30, which is connected to a recovery pipe 22 by means of at least one lifting pump 24 resting on the sea bed 10. An injection line 34, which is the extension of an underwater supply line 16 to the separating chamber 26, will extend inside the separating chamber 26. According to a particularly advantageous embodiment of the invention, the diameter of the injection line 34 is less than that of the underwater supply line 16 so as to be able to increase the flow velocity of the multiphase hydrocarbon mixture through the injection line 34.

According to the invention, the cross-sectional area of the lower end 30 of the separating chamber 26 is less than or approximately equal to the difference of the cross-sectional areas of the intermediate zone 32 and of the injection line 34.

The separating chamber 26 is provided in a tubular pipe whose diameter is small compared to its length, so as to be able to install the assembly from a conventional pipe-laying vessel.

The invention claimed is:

1. An underwater facility for gas/liquid separation of a multiphase hydrocarbon mixture, said multiphase hydrocarbon mixture comprising a gas phase and at least one liquid phase,
said underwater facility comprising:
an underwater supply line configured for supplying said multiphase hydrocarbon mixture;
a longitudinal separating chamber configured and intended to be installed approximately vertically, said separating chamber having a lower end, and an opposite upper end, and an intermediate separating zone located between the two opposite ends;
said separating chamber further comprising an injection line connected to said supply line and extending longitudinally inside said intermediate separating zone, said injection line having a tubular wall and having a free end having an axial opening inside said separating chamber, configured to allow said at least one gas phase to escape to said upper end of said separating chamber while allowing said at least one liquid phase to go to said lower end;
wherein said tubular wall is continuous for being impervious to said multiphase hydrocarbon mixture;
wherein said upper end of said separating chamber having a first prolongation; and an exhaust pipe for said at least one gas phase extending in the first prolongation of said upper end of said separating chamber;
wherein said lower end of said separating chamber having a second prolongation; and a recovery pipe for said at least one liquid phase extending in the second prolongation of said lower end of said separating chamber; and
wherein the exhaust pipe and the recovery pipe meet inside a double-walled pipe, and the recovery pipe extending annularly around the exhaust pipe or vice versa.

2. The underwater facility as claimed in claim 1, wherein said separating chamber is configured to be suspended in a marine environment.

3. The underwater facility as claimed in claim 1, further comprising a lifting pump of said at least one liquid phase connected to said lower end of said separating chamber.

4. The underwater facility as claimed in claim 3, further comprising said lower end of said separating chamber having a second prolongation; and a recovery pipe for said at least one liquid phase extending in the second prolongation of said lower end of said separating chamber; and said lifting pump is a vertical pump provided in the prolongation of the lower part of the recovery pipe.

5. The underwater facility as claimed in claim 1, further comprising said injection line and said intermediate separating zone are approximately concentric.

6. The underwater facility as claimed in claim 1, further comprising a ratio of cross sections of said intermediate zone and of said injection line is between 1.5 and 20.

7. The underwater facility as claimed in claim 1, further comprising said separating chamber comprises devices for diverting said multiphase hydrocarbon mixture to promote separation of said gas phase and liquid phases of said hydrocarbon mixture.

8. The underwater facility as claimed in claim 7, further comprising said devices for diverting are mounted rotatably.

9. The underwater facility as claimed in claim 7, further comprising said diverting devices comprise a plate arranged in a helix around said injection line.

10. The underwater facility as claimed in claim 1, further comprising said separating chamber has a chamber length and a chamber diameter, and said chamber length is at least a hundred times greater than said chamber diameter.

11. An underwater facility for gas/liquid separation of a multiphase hydrocarbon mixture, said multiphase hydrocarbon mixture comprising a gas phase and at least one liquid phase,
said underwater facility comprising:
an underwater supply line configured for supplying said multiphase hydrocarbon mixture;
a longitudinal separating chamber configured and intended to be installed approximately vertically, said separating chamber having a lower end, and an opposite upper end, and an intermediate separating zone located between the two opposite ends;
said separating chamber further comprising an injection line connected to said supply line and extending longitudinally inside said intermediate separating zone, said injection line having a tubular wall and having a free end having an axial opening inside said separating chamber, configured to allow said at least one gas phase to escape to said upper end of said separating chamber while allowing said at least one liquid phase to go to said lower end;
wherein said tubular wall is continuous for being impervious to said multiphase hydrocarbon mixture;
wherein said upper end of said separating chamber having a first prolongation; and an exhaust pipe for said at least one gas phase extending in the first prolongation of said upper end of said separating chamber;
wherein said lower end of said separating chamber having a second prolongation; and a recovery pipe for said at least one liquid phase extending in the second prolongation of said lower end of said separating chamber; and
wherein the exhaust pipe and the recovery pipe meet in an umbilical including several fluid lines, said exhaust pipe being connected to a first set of one or more fluid lines of said umbilical and said recovery pipe being connected to a second set of one or more fluid lines of said umbilical which are different from the fluid lines of said first set.

12. The underwater facility as claimed in claim 11, wherein said separating chamber is configured to be suspended in a marine environment.

13. The underwater facility as claimed in claim 11, further comprising a lifting pump of said at least one liquid phase connected to said lower end of said separating chamber.

14. The underwater facility as claimed in claim 13, further comprising said lower end of said separating chamber having a second prolongation; and a recovery pipe for said at least one liquid phase extending in the second prolongation of said lower end of said separating chamber; and said lifting pump is a vertical pump provided in the prolongation of the lower part of the recovery pipe.

15. The underwater facility as claimed in claim 11, further comprising said injection line and said intermediate separating zone are approximately concentric.

16. The underwater facility as claimed in claim 11, further comprising a ratio of cross sections of said intermediate zone and of said injection line is between 1.5 and 20.

17. The underwater facility as claimed in claim 11, further comprising said separating chamber comprises devices for diverting said multiphase hydrocarbon mixture to promote separation of said gas phase and liquid phases of said hydrocarbon mixture.

18. The underwater facility as claimed in claim 17, further comprising said devices for diverting are mounted rotatably.

19. The underwater facility as claimed in claim 17, further comprising said diverting devices comprise a plate arranged in a helix around said injection line.

20. The underwater facility as claimed in claim 11, further comprising said separating chamber has a chamber length and a chamber diameter, and said chamber length is at least a hundred times greater than said chamber diameter.

21. The underwater facility as claimed in claim 11, further comprising an exhaust pipe and the recovery pipe meet inside a double-walled pipe, and the recovery pipe extending annularly around the exhaust pipe or vice versa.

\* \* \* \* \*